United States Patent
Kamon et al.

(10) Patent No.: US 7,508,422 B2
(45) Date of Patent: Mar. 24, 2009

(54) IMAGE SENSING APPARATUS COMPRISING A LOGARITHMIC CHARACTERISTIC AREA AND A LINEAR CHARACTERISTIC AREA

(75) Inventors: Koichi Kamon, Sakai (JP); Kazuchika Sato, Kobe (JP); Jun Minakuti, Sakai (JP)

(73) Assignee: Konica Minolta Holdings, Inc., Tokyo (JP)

(*) Notice: Subject to any disclaimer, the term of this patent is extended or adjusted under 35 U.S.C. 154(b) by 838 days.

(21) Appl. No.: 11/052,327

(22) Filed: Feb. 7, 2005

(65) Prior Publication Data

US 2006/0001748 A1    Jan. 5, 2006

(30) Foreign Application Priority Data

Jul. 1, 2004    (JP) .............................. 2004-195637

(51) Int. Cl.
*H04N 5/235* (2006.01)
(52) U.S. Cl. ................. 348/229.1; 348/222.1; 348/294; 348/364
(58) Field of Classification Search .............. 348/229.1, 348/222.1, 294, 308, 364, 362; 382/166; 250/551
See application file for complete search history.

(56) References Cited

U.S. PATENT DOCUMENTS 6,630,960 B2* 10/2003 Takahashi et al. ........... 348/364
7,061,529 B2* 6/2006 Nakamura ............... 348/222.1
7,359,549 B2* 4/2008 Ikebe et al. ................. 382/166
2004/0036785 A1 2/2004 Takayanagi
2004/0227109 A1* 11/2004 Storm et al. ................. 250/551
2005/0052557 A1* 3/2005 Kusaka et al. ............... 348/308

FOREIGN PATENT DOCUMENTS

JP     8-9244 A    1/1996
JP     2002-33961 A    1/2002

(Continued)

OTHER PUBLICATIONS

Japanese "Notice of Reasons for Rejections", dated May 29, 2007, for counterpart Japanese Patent Application No. 2004-195637; along with an English-language translation thereof.

(Continued)

*Primary Examiner*—Lin Ye
*Assistant Examiner*—Gevell Selby
(74) *Attorney, Agent, or Firm*—Sidley Austin LLP

(57) ABSTRACT

An image sensing apparatus is provided with an image sensor having a photoelectric conversion characteristic comprised of a linear characteristic area where an electrical signal is outputted after being linearly converted in relation to an amount of an incident light and a logarithmic characteristic area where the electrical signal is outputted after being logarithmically converted in relation to the amount of the incident light. An evaluation value detector of a signal processing unit detects evaluation values concerning an image sensing control from each of the linear characteristic area and the logarithmic characteristic area upon picking up an image of a subject based on pieces of subject luminance information in the respective areas. A central control unit (image sensing controller) carries out the image sensing control based on the evaluation values corresponding to the respective areas detected by the evaluation value detector.

16 Claims, 24 Drawing Sheets

FOREIGN PATENT DOCUMENTS

| | | |
|---|---|---|
| JP | 2002-77733 A | 3/2002 |
| JP | 2002-223392 A | 8/2002 |
| JP | 2002-300476 A | 10/2002 |
| JP | 2005-536928 A | 12/2005 |

OTHER PUBLICATIONS

Japanese Unexamined Patent Publication No. (A) 2002-0033961 (Minolta Co Ltd), published Jan. 31, 2002; Together with an English-language abstract thereof.

Japanese Unexamined Patent Publication No. (A) HE08-009244 (Canon KK), published Jan. 12, 1996; Together with an English-language abstract thereof.

Japanese Unexamined Patent Publication No. (A) 2005-536928 (Isao Takayanagi), published Dec. 2, 2005; Together with an English-language abstract.

Japanese Unexamined Patent Publication No. (A) 2002-077733 (Minolta Co Ltd), published Mar. 15, 2002.

Japanese Unexamined Patent Publication No. (A) 2002-223392 (Minolta Co Ltd), published Aug. 9, 2002; Together with an English-language abstract thereof.

* cited by examiner

FIG.3

COLOR FILTER CONFIGURATION

| R00 | Gr10 | R20 | Gr30 |
|-----|------|-----|------|
| Gb01 | B11 | Gb21 | B31 |
| R02 | Gr12 | R22 | Gr32 |
| Gb03 | B13 | Gb23 | B33 |

G: GREEN PIXEL

R: RED PIXEL

B: BLUE PIXEL

FIG.6

| | CONTROL FACTOR | SPECIFIC CONTROLLER |
|---|---|---|
| EXPOSURE CONTROL <br> \|\| <br> AE CONTROL | PHOTOELECTRIC CONVERSION CHARACTERISTIC OF IMAGE SENSOR (DYNAMIC RANGE) | ○ CONTROL A SWITCHING POINT (INFLECTION POINT) BETWEEN LINEAR CHARACTERISTIC AREA AND LOGARITHMIC CHARACTERISTIC AREA |
| | EXPOSURE AMOUNT (TOTAL AMOUNT OF LIGHT REACHING A SENSING SURFACE WHILE PHOTOELECTRICALLY CONVERTING FUNCTION IS EFFECTIVE) | ○ ADJUST AN APERTURE AMOUNT <br> ○ ADJUST AN INTEGRATION PERIOD (SHUTTER SPEED, ETC.) |

FIG.15

| 1 | 2 | 3 | 4 | 5 |
|---|---|---|---|---|
| 6 | A B C D E F | | | 7 |
|   | G H I J K L | | |   |
| 8 | M N O P Q R | | | 9 |
|   | S T U V W X | | |   |
| 10 | Y Z AA AB AC AD | | | 11 |
|   | AA AF AG AM AI AJ | | |   |
| 12 | 13 | 14 | 15 | 16 |

330 — outer frame
331 — row indicator
332 — right side
333 — selection

IMAGE SENSING APPARATUS COMPRISING A LOGARITHMIC CHARACTERISTIC AREA AND A LINEAR CHARACTERISTIC AREA

This application is based on patent application No. 2004-195637 filed in Japan, the contents of which are hereby incorporated by references.

BACKGROUND OF THE INVENTION

Field of the Invention

The present invention relates to an image sensing apparatus provided with an image sensor for generating an electrical signal corresponding to an amount of an incident light and particularly to an image sensing apparatus using an image sensor having, as photoelectric conversion characteristics, a linear characteristic area where the electrical signal is linearly converted in relation to the amount of the incident light and a logarithmic characteristic area where the electrical signal is linearly converted in relation to the amount of the incident light (the operation in a linear characteristic area and the operation in a logarithmic characteristic area can be switched).

There have been known image sensors (also called "LOG sensor") in which a logarithmic converting circuit provided with a MOSFET is added to a solid-state image sensing device in which photoelectric conversion elements such as photodiodes are arranged in matrix, a subthreshold characteristic of the MOSFET is taken advantage of to make an output characteristic of the solid-state sensing device such that the electrical signal is logarithmically converted in relation to the amount of the incident light. Some of such image sensors are known to be such that the original output characteristic of the solid-state imaging sensing device, i.e., the linear operative state in which the electrical signal is linearly converted in relation to the amount of the incident light, and the aforementioned logarithmic operative state can be switched.

For example, Japanese Unexamined Patent Publication No. 2002-77733 discloses an image sensing apparatus in which a linear operative state can be automatically switched to a logarithmic operative state and switching points of the respective pixels are set to be equal by giving a specified reset voltage to a MOSFET. Japanese Unexamined Patent Publication No. 2002-300476 also discloses an image sensing apparatus in which a linear operative state can be automatically switched to a logarithmic operative state and a potential state of a MOSFET can be adjusted by adjusting a reset time of the MOSFET.

Since an output proportional to an amount of charges generated by the photoelectric conversion elements can be obtained in the case of using an image sensor in a linear operative state, there are an advantage of being able to obtain a high-contrast (having a high gradation) image signal even if an object has a low luminance and other advantages, whereas there is a disadvantage of a narrower dynamic range. On the other hand, since an output natural-logarithmically converted in relation to an amount of an incident light can be obtained in the case of using the image sensor in a logarithmic operative state, there is an advantage of ensuring a wide dynamic range, whereas there is a disadvantage of a poorer contrast due to the logarithmic compression of an image signal.

The image sensors in the above two publications only disclose that the operative state of the image sensor can be automatically changed from the linear operative state to the logarithmic operative state. However, in view of the aforementioned advantages and the disadvantages of the linear and logarithmic operative states, it is desirable to positively utilize the advantages of the respective operative states to perform an image sensing operation instead of merely automatically switching the operative states. For example, in the case of an automatic exposure control as well, there is a possibility of carrying out an optimal automatic exposure control utilizing the advantages of the respective operative states if the control is carried out in conjunction with the luminance of a subject as a target and the switching point of the image sensor from the linear operative state to the logarithmic operative state.

Further, in order to precisely carry out a control of a an image sensing operation such as an automatic exposure control utilizing a linear operative state and a logarithmic operative state, evaluation data for the control of the image sensing operation used to picked-up images in the respective operative states of the linear operative state and the logarithmic operative state need to be those obtained in the respective operative states (respective characteristic areas). In view of, for example, the fact that an image signal obtained by the image sensing in the logarithmic operative state is outputted after being logarithmically converted, it is not preferable in realizing a precise control to use an evaluation data obtained in the logarithmic operative state for an picked-up image obtained in the linear operative state without distinguishing the evaluation data to be the one obtained in the logarithmic operative state.

SUMMARY OF THE INVENTION

It is an object of the present invention to provide an image sensing apparatus which is free from the problems residing in the prior art.

According to an aspect of the invention, in an image sensing apparatus provided with an image sensor to generate an electrical signal corresponding to an amount of an incident light and having a photoelectric conversion characteristic comprised of a linear characteristic area where the electrical signal is outputted after being linearly converted in relation to the amount of the incident light and a logarithmic characteristic area where the electrical signal is outputted after being logarithmically converted in relation to the amount of the incident light, evaluation values concerning an image sensing control from each of the linear characteristic area and the logarithmic characteristic area upon picking up an image of a subject are detected based on pieces of subject luminance information in the respective areas. Image sensing control is carried out based on evaluation values corresponding to respective detected areas.

The image sensing operation can be controlled in conjunction with a photoelectric conversion characteristic more precisely.

These and other objects, features and advantages of the present invention will become more apparent upon a reading of the following detailed description and accompanying drawings.

BRIEF DESCRIPTION OF THE DRAWINGS

FIG. 3 is a diagram showing one example of a color filter configuration of an image sensor used in the electronic camera;

FIG. 6 is a table showing definitions of terms concerning an exposure control;

FIG. 15 is a diagram showing a divided state of a sensing area (light measurement range) upon a divided light measurement by the image sensor;

FIGS. 18A and 18B are graphs showing changing states of the photoelectric conversion characteristic of the image sensor in the case of carrying out an AE control, wherein FIG. 18A shows a change in the case of carrying out an exposure amount control and FIG. 18B shows a change in the case of carrying out a dynamic range control;

FIGS. 22A and 22B are graphs showing a method for calculating the position of an inflection point of the photoelectric conversion characteristic upon calculating a dynamic range control parameter, wherein FIG. 22A shows a case where the photoelectric conversion characteristic is so changed as to take a specified sensor output at luminance Lmax and FIG. 22B shows a case where the photoelectric conversion characteristic is modeled;

DETAILED DESCRIPTION OF THE PREFERRED EMBODIMENTS OF THE PRESENT INVENTION

Hereinafter, one embodiment of the present invention is described with reference to the accompanying drawings.

(Description of the Outer Configuration of an Image Sensing Apparatus)

Figure 1A:
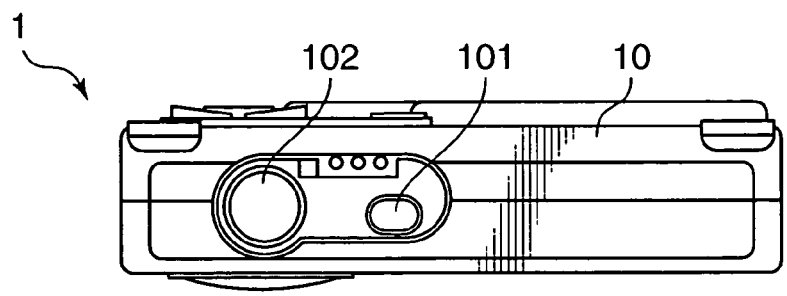
FIGS. 1A, 1B and 1C are a top view, a front view and a rear view showing the outer configuration of a small-size electronic camera to which an image sensing apparatus according to the invention is suitably applied.
Figure 1B:
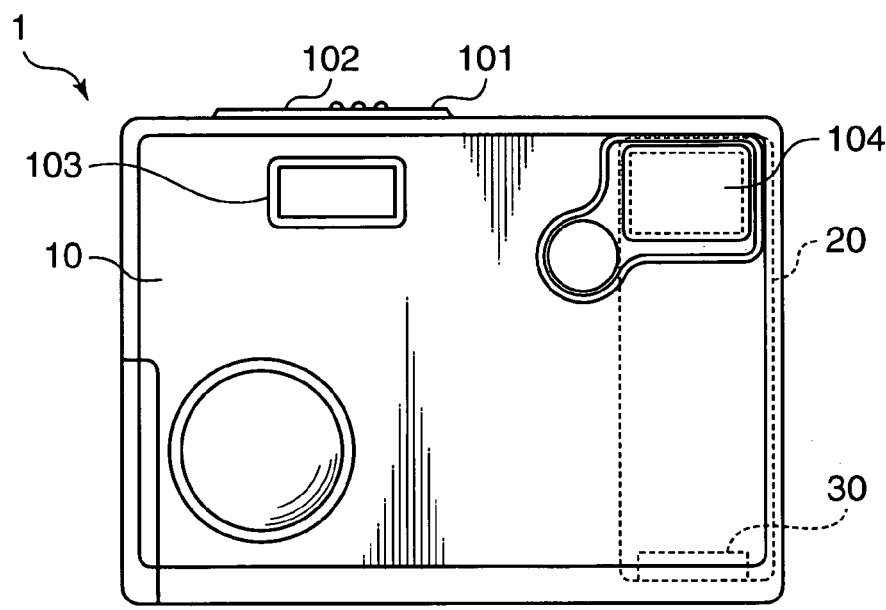
Figure 1C:
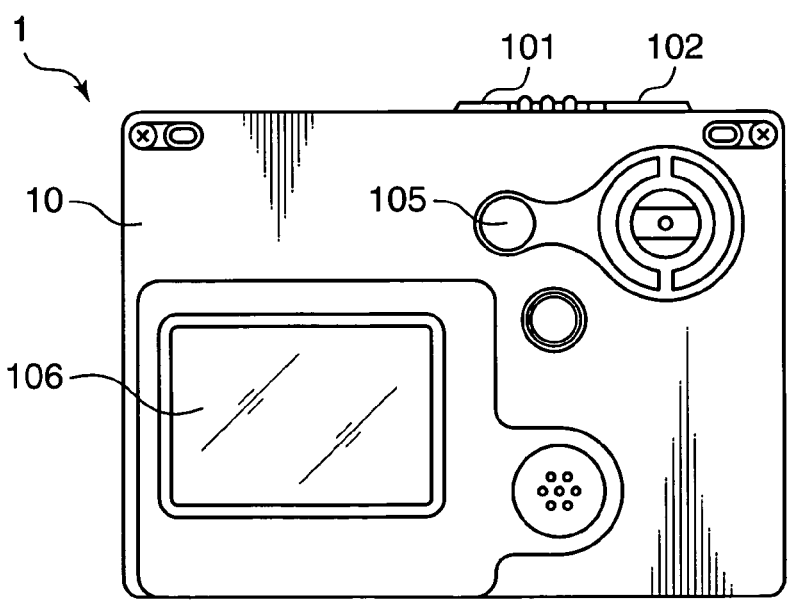

FIGS. 1A, 1B and 1C are a top view, a front view and a rear view showing the outer configuration of a small-size electronic camera 1 to which an image sensing apparatus according to the invention is suitably applied. On this electronic camera (image sensing apparatus) 1, a power switch 101, a release switch 102 and the like are arranged on the top surface of a camera main body 10; a flash firing section 103, a photographing lens window 104 and the like are arranged on the front surface; and various operation buttons such as a mode setting switch 105, a LCD device 106 including a liquid crystal monitor (LCD) and the like are arranged on the rear surface. In addition, a bent-type barrel 20 as well as various devices are arranged inside the main body 10.

The power switch 101 is a pressable switch used to turn on (start) and off (stop) a power supply of the camera 1. Every time the power switch 101 is pressed, the power supply of the camera 1 is alternatively and repeatedly turned on and off. The mode setting switch 105 is used to set two modes: a still-image photographing mode for picking up a still image and a moving-image photographing mode for picking up moving images.

The release switch 102 is a pressable switch which can be brought to a "half-pressed state" reached by being pressed halfway and a "full-pressed state" reached by being pressed further down. For example, if the release switch 102 is pressed halfway in the still-image photographing mode, preparatory operations (including an automatic exposure control and an automatic focusing control to be described later) are performed to pick up a still image of a subject. When the release switch 102 is fully pressed, photographing operations (a series of operations of exposing an image sensor to be described later, applying a specified image processing to an image signal obtained by this exposure, and saving the processed image signal in a memory card or the like) are performed. When the release switch 102 is fully pressed in the moving-image photographing mode, specified moving-image picking-up operations are carried out. These operations are ended when the release switch 102 is fully pressed again.

The flash firing section 103 emits a light to illuminate a subject when a subject image is dark with the release switch 102 pressed halfway (still-image photographing mode). The photographing lens window 104 is an opening for introducing a light image of the subject into the bent-type barrel 20 arranged inside the main body 10. The LCD device 106 is adapted to display the reproduction of a saved image in a built-in storage medium and to display a through image (live-view image) of the subject video-photographed in a photographing standby state and in the moving-image photographing mode. A group of push switches including a zoom switch, a menu selection switch and a selection determination switch are provided in addition to the mode setting switch 105.

The bent-type barrel 20 constructs a photographing lens system for taking the subject image in through the photographing lens window 104 and introducing it to an image sensor 30 arranged inside the main body 10. This barrel 20 is a barrel whose length does not change during zooming or focusing, i.e., which does not project out of the main body 10. Inside the barrel 20 are provided a lens group 21 (see FIG. 2) constructing a photographing optical system comprised of a zoom lens block and a fixed lens block arranged in series along an optical axis, and a diaphragm 22 arranged at a specified position of the lens group 21. A shutter 23 is also arranged at a specified position of the lens group 21, and a light path of the photographing optical system is blocked and permitted to pass a light by closing and opening the shutter 23. In other words, an exposure amount of the image sensor 30 is controlled by an aperture area of the diaphragm 22 and a control to open and close the shutter 23.

(Overall Description of the Electrical Construction of the Image Sensing Apparatus)

Figure 2:
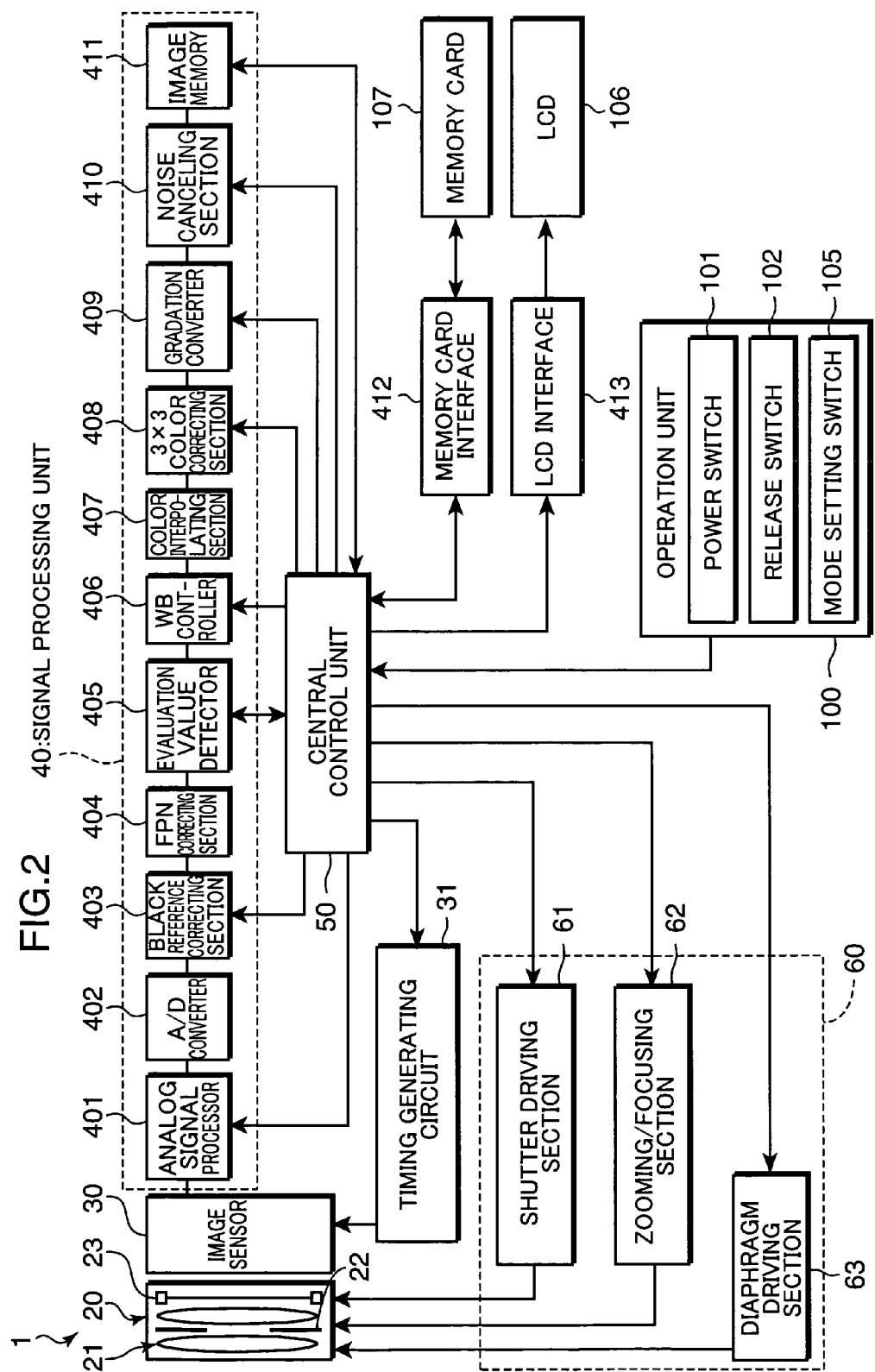
FIG. 2 is an image sensing block diagram of the electronic camera.

FIG. 2 is an image sensing block diagram of the electronic camera 1 according to the present invention. This electronic camera 1 is provided with an operation unit 100, the aforementioned bent-type barrel 20, the image sensor 30, a signal processing unit 40, a central control unit 50 and a driving unit 60. The operation unit 100 includes the power switch 101, the release switch 102, the mode setting switch 105 and the like described above.

The image sensor 30 photoelectrically converts the subject image focused by the lens group 21 in the barrel 20 into image signals of the respective components R (red), G (green) and B (blue) (signals comprised of signal sequences of pixel signals detected by the respective pixels of the image sensor 30) in accordance with a light amount of the subject image and outputs the resultant to the signal processing unit 40. In this embodiment, a solid-state image sensing device of the logarithmic conversion type for outputting pixel signals (output electrical signals generated by photoelectric conversion) after not linearly, but logarithmically converting them in accordance with an amount of an incident light is used as the image sensor 30. This image sensor 30 has such a property of outputting pixel signals after linearly converting them in the case of a small amount of an incident light, and is provided with an area where the photoelectric conversion characteristic thereof is linear (linear characteristic area=dark time) and an area where the photoelectric conversion characteristic thereof is logarithmic (logarithmic characteristic area=bright time). A switching point (inflection point) between the linear characteristic area and logarithmic characteristic area can be arbitrarily controlled by a specified control signal (dynamic range control signal). The construction, operation and the like of this image sensor 30 are described in detail later.

A timing generating circuit (timing generator) 31 controls a photographing operation (storing of electric charges based on an exposure, readout of the stored electric charges, etc.) by the image sensor 30. The timing generating circuit 31 generates specified timing pulses (pixel drive signals, horizontal synchronization signals, vertical synchronization signals, horizontal scanning circuit drive signals, vertical scanning circuit drive signals, etc.) in accordance with a photographing control signal from the central control unit 50 and outputs them to the image sensor 30. In the moving-image photographing mode (through image display mode), the timing generating circuit 31 picks up frame images every, e.g., 1/30 sec. and successively outputs them to the signal processing unit 40. The timing generating circuit 31 also causes electric charges to be stored (i.e., the subject light image is photoelectrically converted into an image signal) as the image sensor 30 is exposed during the exposure in the still-image photographing mode, and causes the stored electric charges to be outputted to the signal processing unit 40. Further, the timing generating circuit 31 generates clocks for analog-to-digital (A/D) conversion used in an A/D converter 402 to be described later.

The signal processing unit 40 applies specified analog and digital signal processings to the image signal sent from the image sensor 30, wherein the image signal is processed for each pixel signal constituting the image signal. This signal processing unit 40 is provided with an analog signal processor 401, the A/D converter 402, a black reference correcting section 403, a FPN (fixed pattern noise) correcting section 404, an evaluation value detector 405, a white balance (WB) controller 406, a color interpolating section 407, a 3×3 color correcting section 408, a gradation converter 409, a noise canceling section 410 and an image memory 411.

The analog signal processor 401 applies a specified analog signal processing to the image signal (a group of analog signals detected by the respective pixels of the image sensor 30) outputted from the image sensor 30, and includes a CDS circuit (correlated double sampling circuit) for reducing a reset noise included in the analog image signal and an AGC circuit (automatic gain control circuit) for correcting the level of the analog image signal. The AGC circuit also has a function of amplifying the analog image signal using a suitable amplification factor so as to conform to an input volume range of the A/D converter 402 arranged at a later stage, thereby compensating for a level insufficiency of the picked-up image, for example, in the case that no proper exposure was obtained.

The A/D converter 402 functions to convert the analog image signal outputted from the analog signal processor 401 into a digital image signal (image data) of, e.g., 12 bits. This A/D converter 402 converts the analog image signal into the digital image signal in accordance with a clock for A/D conversion inputted from the timing generating circuit 31.

The black reference correcting section 403 carries out a calculation of SD1-SD2 when SD1 denotes the level of the image signal inputted from the A/D converter 402 and SD2 denotes the level of the image signal at a dark time in order to correct the black level (image signal level at the dark time) of the digital image signal inputted from the A/D converter 402 to a reference value (e.g., correct the digital signal level after A/D conversion to 0). Such a black reference correction is made in accordance with an image sensing dynamic range information corresponding to the photoelectric conversion characteristic of the image sensor 30 inputted from the central control unit 50. This is to carry out a precise black reference correction following a change in the image signal level since the photoelectric conversion characteristic of the image sensor 30 can be controlled in the electronic camera 1 of this embodiment and, accordingly, the level of the digital image signal at the dark time inputted from the A/D converter 402 changes by the change of the photoelectric conversion characteristic of the image sensor 30.

The FPN correcting section 404 removes a fixed pattern noise of the image signal inputted from the black reference correcting section 403. The fixed pattern noise is a noise created due to a variation among the threshold values of FETs provided in the respective pixel circuits of the image sensor 30 and resulting from a variation among output values of the pixel signals generated by the respective pixels. The FPN correcting section 404 carries out a calculation of SD3-SD4 when SD3 denotes the level of the image signal inputted from the black reference correcting section 403 and SD4 denotes a fixed pattern component of the image signal inputted from the black reference correcting section 403.

The evaluation value detector 405 detects evaluation values which serve as base values upon carrying out an automatic exposure control (AE), an automatic focusing control (AF), a white balance control (WB control) or the like, i.e., AE evaluation values, AF evaluation values, WB evaluation values, etc. from an image signal actually picked up by the image sensor 30. For example, in the case of the AE control, the following steps are generally taken:

(1) Measure the luminance level and the luminance range of a subject as a target whose image is to be picked up;

(2) Calculate a necessary exposure control amount so that an output conforming to the measured luminance level and luminance range can be obtained from the image sensor;

(3) Specifically adjust an exposure amount and the like based on the calculation result and go onto the substantial photographing.

In order to carry out the step (1), the evaluation value detector 405 calculates the luminance level and the luminance range of a subject from an image signal actually picked up by the image sensor 30 and outputs them as AE evaluation values to the central control unit 50 so that they can be used for the AE control in a later step.

In the case of the AF control, the position of a focusing lens (lens group 21) where the contrast of an image obtained by an image sensing operation is at its maximum is obtained while alternately performing the driving of the focusing lens along a direction of an optical axis and the image sensing by the image sensor 30 (i.e., hill-climbing detecting method), and the calculated position is outputted as an AF control value to the central control unit 50 so as to be used for the AF control in a later step. The WB control is carried out to correct the colors of the output image to those conforming to a light source color of a subject. In this case, the evaluation value detector 405 calculates the luminance ratios and the luminance differences of the respective colors R, G, B in accordance with the image signal inputted from the FPN correcting section 404 arranged at the preceding stage, and outputs them as WB evaluation values to the central control unit 50. Specific methods for obtaining these evaluation values are described in detail later.

The WB controller 406 carries out such a correction as to convert the levels of the pixel data of the respective color components R, G, B in accordance with the dynamic range information given from the central control unit 50 and the WB evaluation values, so that the color balance of the image signal becomes a specified color balance. Since the image sensor 30 used has the linear characteristic area and the logarithmic characteristic area in this embodiment, it is desirable to obtain the WB evaluation values for each of the linear characteristic area and the logarithmic characteristic area and to carry out WB corrections suitable for the respective areas.

The color interpolating section 407 interpolates data at pixel positions lacking color information in a frame image for each color component R, G, B of the image signal inputted from the WB controller 406. Specifically, some pieces of color information are lacking in the color filter configuration of the image sensor 30 of the logarithmic conversion type used in this embodiment since a so-called Bayer system in which G is in a checkerwise arrangement and R, B are in line sequential arrangements is adopted. Thus, the color interpolating section 407 interpolates non-existing pixel data at pixel positions using a plurality of existing pixel data. Specifically, for a frame image of the color component G having pixels up to a high band, the color interpolating section 407 calculates an average value of pixel data excluding those taking a maximum value and a minimum value out of the pixel data existing around the pixel position to be interpolated using a median filter after masking the image data forming the frame image by a specified filter pattern, and interpolates this average value as the pixel data at this pixel position. For the color component R, B, the color interpolating section 407 calculates an average value of pixel data existing around the pixel position to be interpolated after masking the image data forming the frame image by a specified filter pattern and interpolates this average value as the pixel data at this pixel position.

FIG. 3 shows an exemplary color filter configuration of the image sensor 30. The suffix number of each pixel denotes its address number. In such a color filter configuration, the images signals of the color components R, G, B at the respective pixels are generated, for example, as follows by the above color interpolation.

(A) Color Interpolation Equation for Address 11 (B11)

$R11 = (R00 + R20 + R02 + R22)/4$ $G11 = (Gr10 + Gb01 + Gb21 + Gr12)/4$ $B11 = B11$ (B) Color Interpolation Equation for Address 12 (Gr12)

$R12 = (R02 + R22)/2$ $G12 = Gr12$ $B12 = (B11 + B13)/2$ (C) Color Interpolation Equation for Address 21 (Gb21)

$R21 = (R20 + R22)/2$ $G21 = Gb12$ $B21 = (B11 + B31)/2$ (D) Color Interpolation Equation for Address 22 (R22)

$R22 = R22$ $G22 = (Gb21 + Gr12 + Gr32 + Gb23)/4$ $B22 = (B11 + B31 + B13 + B33)/4$

The 3×3 color correcting section 408 corrects the saturation (tint) of the image signals of the color components R, G, B inputted from the color interpolating section 407. The 3×3 color correcting section 408 has three kinds of conversion coefficients for converting the level ratio of the image signals of the color components R, G, B, and corrects the saturation of the image data by converting the image ratio using a conversion coefficient conforming to a photographing scene. For example, the 3×3 color correcting section 408 linearly converts the image signal as follows using a total of nine conversion coefficients a1 to c3.

$R' = a1*R + a2*G + a3*B$ $G' = b1*R + b2*G + b3*B$ $B' = c1*R + c2*G + c3*B$

The gradation converter 409 nonlinearly converts and offset-adjusts the level of the image signal for each color component using a specified gamma characteristic so that the image signals of the color components R, G, B inputted from the 3×3 color correcting section 408 take suitable output levels. Specifically, the gradation converter 409 corrects the gradation characteristic (γ-curve and digital gain) of the image signals having the white balance thereof adjusted and the color thereof corrected to a gradation characteristic of the LCD device 106 or an externally connected monitor television or the like. The gradation converter 409 changes the gradation characteristic of the image signal based on the dynamic range information inputted from the central control unit 50 and the AE evaluation values and the like detected by the evaluation value detector 405.

The noise canceling section 410 corrects the sharpness of the image to a satisfactory one by removing noise components from the image signals inputted from the gradation converter 409 and extracting and emphasizing only edge components. The noise canceling section 410 carries out a proper correction by changing a coring factor (factor used to remove only the noise components of the image signal and to extract and emphasize the edge components) in accordance with the dynamic range information inputted from the central control unit 50.

The image memory 411 is formed by a ROM, RAM or like memory and temporarily saves the image data for which the signal processings in the signal processing unit 40 were completed. The image memory 411 has a capacity capable of saving the image data of, for example, one frame.

A memory card interface 412 is an interface for outputting image data generated in the signal processing unit 40 to be saved in a memory card 107. The memory card 107 is a memory for saving image data such as still images and moving images, and is detachably mountable into the digital camera 1 and enables an image data exchange with an external storage medium. An LCD interface 413 is an interface for converting an image data generated in the signal processing unit 40 to be displayed on the LCD device 106 into an image signal of the NTSC system or the PAL system and outputting it to the LCD device 106.

The central control unit 50 includes a CPU (central processing unit) and the like for centrally controlling the photographing operation of the digital camera 1. Specifically, the central control unit 50 calculates and transmits an operation information such as parameters required by the respective sections of the signal processing unit 40 in accordance with pieces of information sent from the respective sections of the signal processing unit 40 (aforementioned AE evaluation values, AF evaluation values, WB evaluation values, etc.) and the operation mode of the digital camera 1, thereby controlling the operations of the respective sections of the signal processing unit 40. In addition, the central control unit 50 carries out the control of the timing generating circuit 31 for the photographing operation, zooming and focusing of the lens group 21, the control of the driving unit 60 to drive the diaphragm 22 and the shutter 23, and the output control of the image signal.

Figure 4:
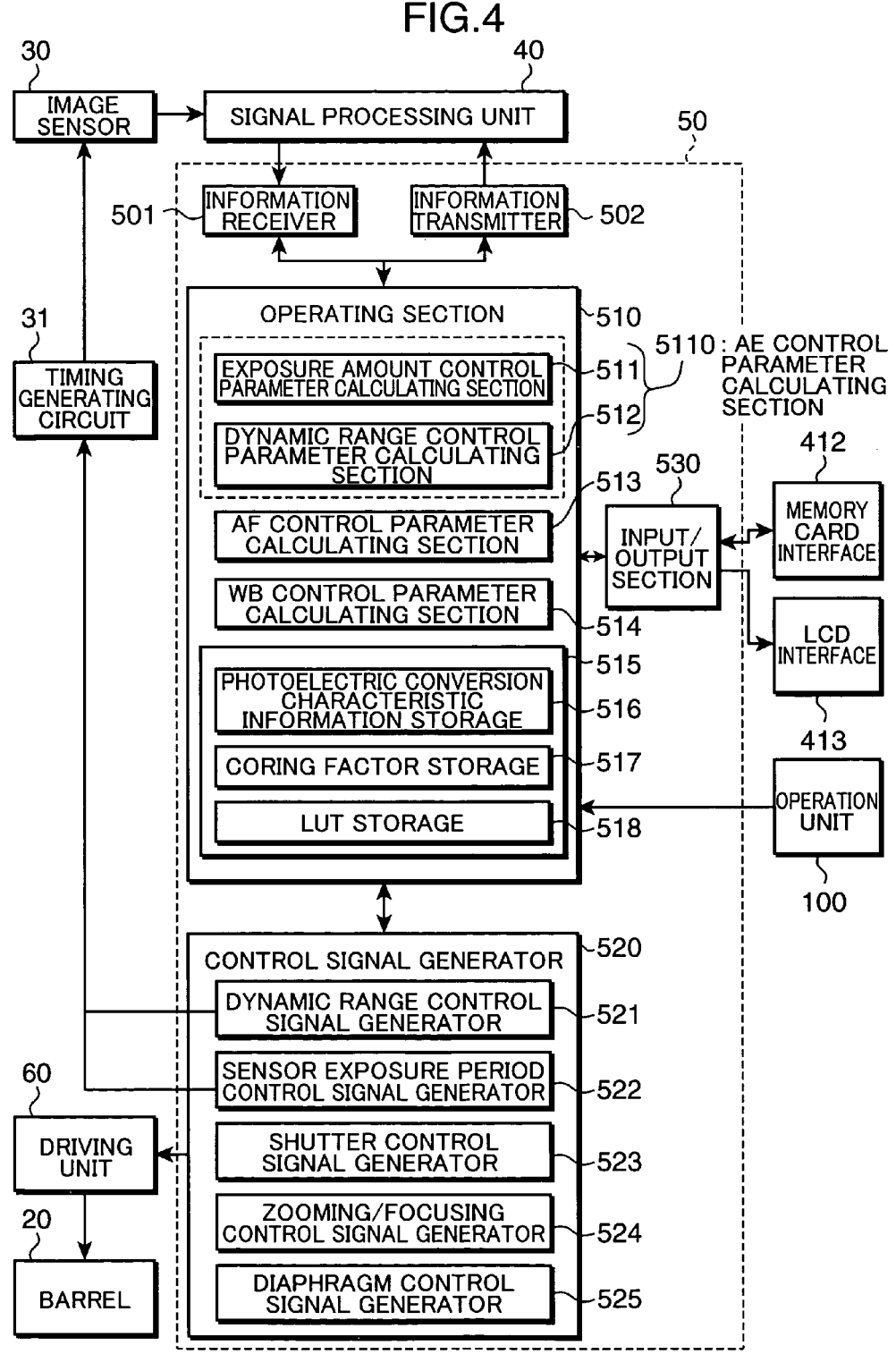
FIG. 4 is a function block diagram showing functions of a central control unit provided in the electronic camera.

FIG. 4 is a function block diagram showing functions of the central control unit 50, which is provided with an information receiver 501, an information transmitter 502, a operating section 510 including a memory portion 515, a control signal generator 520 and an input/output section 530.

The information receiver 501 obtains the AE evaluation values, the AF evaluation values and the WB evaluation values detected by the evaluation value detector 405, of the signal processing unit 40, and distributes and transmits them to the respective parameter calculating sections of the operating section 510. On the other hand, the information transmitter 502 suitably reads information (photoelectric conversion characteristic information, coring factor, etc.) required in the signal processing unit 40 from the memory portion 515 and suitably distributes and transmits it to the respective sections of the signal processing unit 40.

The operating section 510 calculates control parameters based on the evaluation values given from the information receiver 501 and includes an AE control parameter calculating section 5110 comprised of an exposure amount control parameter calculating section 511 and a dynamic range control parameter calculating section 512, an AF control parameter calculating section 513, a WB control parameter calculating section 514 and the memory portion 515.

The memory portion 515 is formed by a ROM, RAM or the like, and includes a photoelectric conversion characteristic information storage 516 for saving information on the photoelectric conversion characteristic of the image sensor 30 (information used to obtain a desired photoelectric conversion characteristic upon photographing), i.e., an exposure period set value and an aperture set value to be described later or a photoelectric conversion characteristic set value (dynamic range information corresponding to the photoelectric conversion characteristic), a coring factor storage 517 for saving a set position of the coring factor used in the noise canceling section 410, and a LUT storage 518 for saving a conversion information used to convert (mutual conversion) the data obtained in the linear and logarithmic characteristic areas of the image sensor 30, i.e., a LUT (look-up table).

Figure 10:
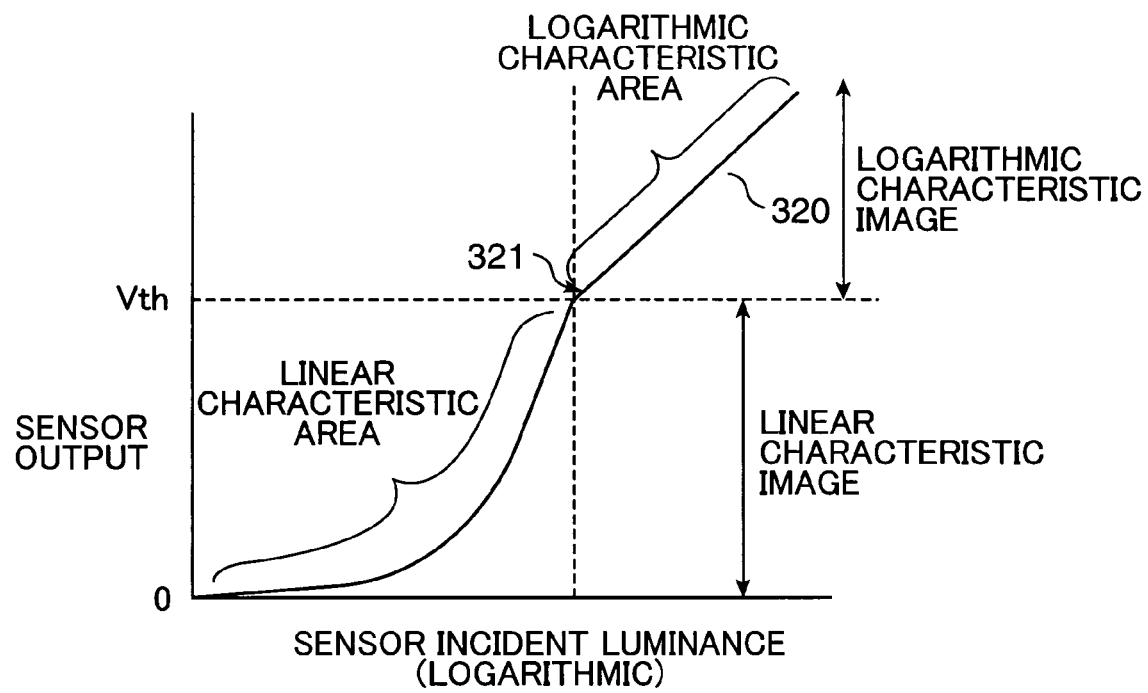
FIG. 10 is a graph showing an exemplary photoelectric conversion characteristic of the image sensor.

The photoelectric conversion characteristic information storage 516 may be so constructed as to save the photoelectric conversion characteristic itself (photoelectric conversion characteristic curve as shown in FIG. 10 described later). In addition to the above LUT, the LUT storage 518 saves various other LUTs for data conversions including a LUT for the data conversion of values of an exposure period (T1) and an aperture area of the diaphragm (S2) to be described later into an exposure period set value and an aperture set value, an LUT for the data conversion of a value (output level) of the inflection point of the photoelectric conversion characteristic into a photoelectric conversion characteristic set value, an LUT for outputting the photoelectric conversion characteristic set value based on a maximum luminance output level or outputting a changed amount of the photoelectric conversion characteristic set value based on a changed amount of the maximum luminance output level, and an LUT for the data conversion of the number of saturated pixels into a changed amount (ΔVth) of the inflection point. As described above, data values saved in the photoelectric conversion characteristic information storage 516, the coring factor storage 517 and the LUT storage 518 are suitably transmitted from the information transmitter 502 to the corresponding sections of the signal processing unit 40.

The AE control parameter calculating section 5110 calculates control parameters used to set an optimal exposure amount and an optimal photoelectric conversion characteristic of the image sensor 30 upon photographing in order to carry out an exposure control (AE control) corresponding to the luminance of the subject. Specifically, the exposure amount control parameter calculating section 511 of the AE control parameter calculating section 5110 calculates a control parameter used to optimize the exposure period and the aperture value, and calculates the exposure period set value and the aperture set value corresponding to the luminance of the subject in accordance with the AE evaluation values detected by the evaluation value detector 405 and the photoelectric conversion characteristic information of the image sensor 30 at the time when the AE evaluation values saved in the photoelectric conversion characteristic information storage 516 were obtained.

The dynamic range control parameter calculating section 512 calculates a control parameter used to optimize the photoelectric conversion characteristic of the image sensor 30 in accordance with the luminance of the subject. The dynamic range control parameter calculating section 512 calculates, for example, such a photoelectric conversion characteristic set value that the subject luminance for setting the dynamic range takes a desired saturated output level in the image sensor 30. Upon this calculation as well, the photoelectric conversion characteristic information of the image sensor 30 at the time when the AE evaluation values saved in the photoelectric conversion characteristic information storage 516 were obtained is referred to. The operation and the like of the AE control parameter calculating section 5110 are described in detail later.

The AF control parameter calculating section 513 calculates control parameters used to set an optimal focal length upon photographing the subject in accordance with the AF evaluation values detected by the evaluation value detector 405. Upon calculating this control parameter, it is preferable to obtain the AF evaluation values to be referred to in the respective logarithmic and linear characteristic areas of the image sensor 30 and to calculate the control parameters for rough distance measurement (AF evaluation value obtained from the logarithmic characteristic area) and for detailed distance measurement (AF evaluated obtained from the linear characteristic area) utilizing the characteristics of the respective characteristic areas.

The WB control parameter calculating section 514 calculates control parameters used to set the color balance of the image signal at a specified color balance in accordance with the WB evaluation values detected by the evaluation value detector 405. Upon calculating these control parameters, it is likewise preferable to obtain the AF evaluation values to be referred to in the respective logarithmic and linear characteristic areas of the image sensor 30 and to calculate the control parameters corresponding to the respective characteristic areas.

The control signal generator 520 generates control signals for driving the respective controllable elements in accordance with the various control parameters calculated in the operating section 510 and includes a dynamic range control signal generator 521, a sensor exposure period control signal generator 522, a shutter control signal generator 523, a zooming/focusing control signal generator 524 and a diaphragm control signal generator 525.

The dynamic range control signal generator 521 generates a drive signal for the image sensor 30 used to adjust an output level point (inflection point) where the photoelectric conversion characteristic is switched from the linear characteristic area to the logarithmic characteristic area in accordance with the photoelectric conversion characteristic set value of the image sensor 30 calculated in the dynamic range control parameter calculating section 512, and sends it to the timing generating circuit 31. The timing generating circuit 31 generates a timing signal for controlling the dynamic range of the image sensor 30 in accordance with the received drive signal, thereby causing the image sensor 30 to be driven. Specifically, the photoelectric conversion characteristic of the image sensor 30 has its inflection point changed by controlling a signal φVPS (level of a voltage VPH or the length of a period ΔT in φVPS) for the image sensor 30 as described later. Thus, the dynamic range control signal generator 521 controls the dynamic range of the image sensor 30 in conformity with the subject luminance by controlling the drive signal to be sent to the timing generating circuit 31 for controlling the signal φVPS in accordance with the photoelectric conversion characteristic set value.

The sensor exposure period control signal generator 522 generates a control signal for controlling the exposure period (integration period) of the image sensor 30 by a controlling operation as an electronic circuit without depending on the mechanical operations of the diaphragm 22, the shutter 23 and the like. The generator 522 generates a drive signal for the image sensor 30 (specifically, a signal for controlling a period ΔS during which the signal φVPS to be sent to the image sensor 30 takes a medium potential M as described later) in such a manner as to ensure a predetermined exposure period based on the optimal exposure amount calculated in the exposure amount control parameter calculating section 511, and sends it to the timing generating circuit 31. The timing generating circuit 31 generates a timing signal for controlling the exposure period of the image sensor 30 to drive the image sensor 30 in accordance with the inputted drive signal.

The shutter control signal generator 523 likewise generates a control signal for setting the shutter speed (shutter opening period) of the shutter 23 in conformity with the exposure period based on the optimal exposure amount calculated in the exposure amount control parameter calculating section 511. The zooming/focusing control signal generator 524 generates a control signal for driving the lens group 21 based on the optimal focal length calculated in the AF control parameter calculating section 513. Further, the diaphragm control signal generator 525 generates a control signal for setting the aperture area of the diaphragm 22 based on the optimal exposure amount calculated in the exposure amount control parameter calculating section 511. The control signals generated in the generators 523, 524 and 525 are sent to the corresponding sections of the driving unit 60.

The input/output section 530 is connected with the memory card interface 412 and the LCD interface 413. In accordance with a designation signal or the like from the operation unit 100, the input/output section 530 saves a photographed image signal in the memory card 107 or displays it on the LCD device 106 after applying specified image processings to the picked-up image, or conversely reads an image signal from the memory card 107.

Referring back to FIG. 2, the driving unit 60 actually operates mechanically drivable devices of the electronic camera 1 and includes a shutter driving section 61, a zooming/focusing section 62 and a diaphragm driving section 63.

The shutter driving section 61 opens and closes the shutter 23 so that the shutter 23 is open for a predetermined period in accordance with the control signal given from the shutter control signal generator 523. The zooming/focusing section 62 drives a motor or the like for driving the zoom lens block or focusing lens block of the lens group 21 in accordance with the control signal given from the zooming/focusing control signal generator 524, thereby moving the lens block to a focusing position. The diaphragm driving section 63 drives the diaphragm 22 to set a specified aperture amount in accordance with the control signal given from the diaphragm control signal generator 525.

(Description of the Overall Operation Flow)

Figure 5:
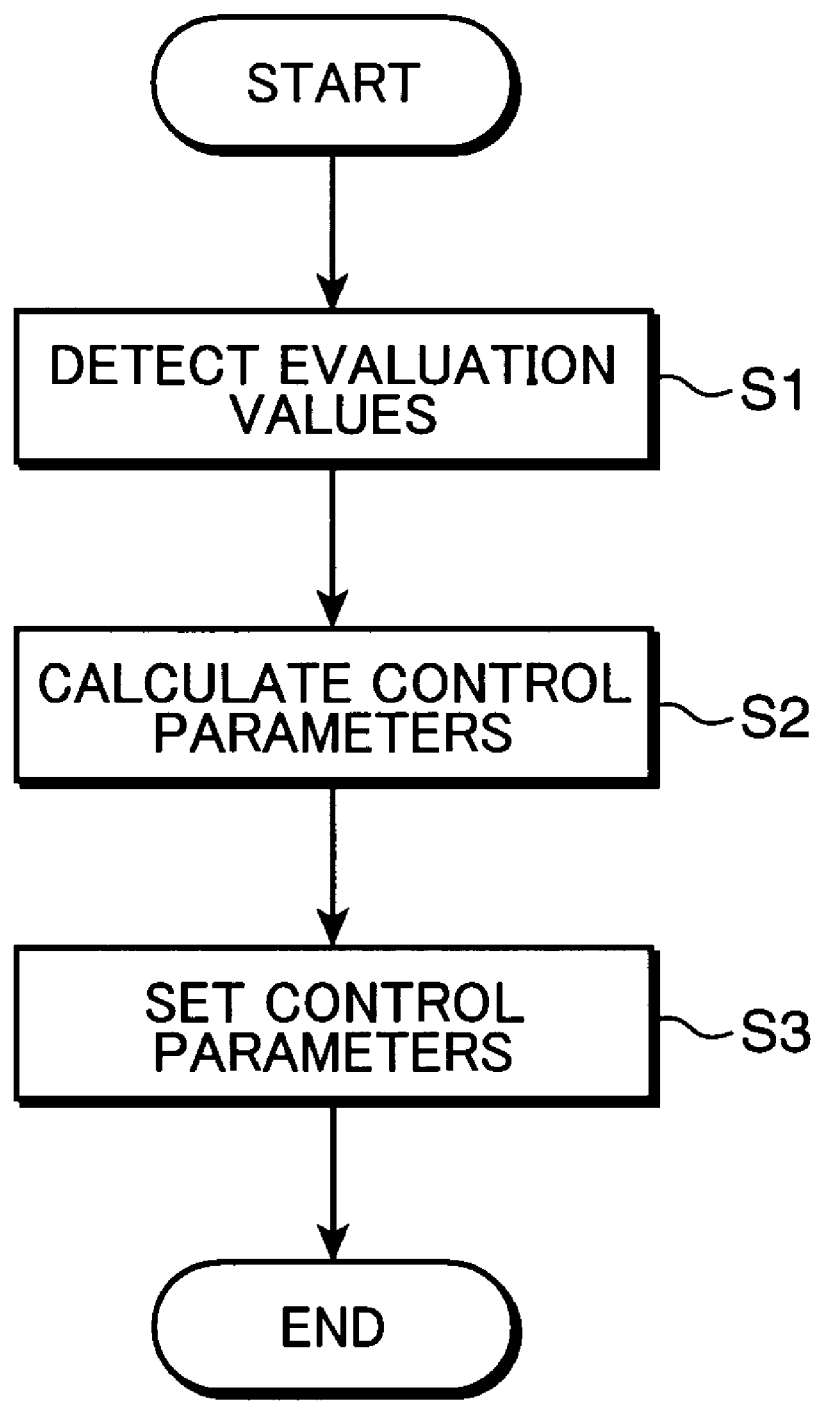
FIG. 5 is a flowchart showing one example of the entire operation of the electronic camera.

First, the overall flow of the operation of the electronic camera 1 of this embodiment constructed as above is described. FIG. 5 is a flowchart showing one example of the overall operation of the electronic camera 1. As shown in FIG. 5, this overall operation is roughly comprised of an evaluation value detecting step for detecting the evaluation values such as the AE evaluation values, AF evaluation values and the WB evaluation values (Step S1), a control parameter calculating step for calculated various parameters based on the obtained evaluation values (Step S2), and a control parameter setting step for setting the calculated parameters in the corresponding parts of the electronic camera 1 and setting the control parameters for driving the respective sections of the electronic camera 1 so as to attain a photographing state corresponding to the parameters (Step S3).

In the respective steps S1 to S3, the following operations are specifically performed.

First, in the evaluation value detecting step S1, the evaluation value information which serves as a base for various controls is obtained and the evaluation values are calculated based on this evaluation value information. In the case of the AE control, the luminance level of a subject as a photographing target is measured (detected) and the AE evaluation values are calculated from this measurement value. The luminance level and the luminance range can be detected as follows since it is rational to detect them from an image actually picked up by the image sensor 30 and the image sensor 30 can pick up both still images and moving images.

(Step S1-1) Detection from a still image: An image used to detect the evaluation values is obtained from a still image picked up by the image sensor 30 before the substantial photographing, and the luminance level and the luminance range are measured.

(Step S1-2) Measurement from moving images: An image used to detect the evaluation values is obtained from moving images picked up by the image sensor 30 before the substantial photographing, and the luminance level and the luminance range are measured.

These two steps of obtaining the luminance information can be raised as examples and, thereafter, Step S1-3 follows.

(Step S1-3) Calculation of evaluation values: Various evaluation values including the AE evaluation values are calculated based on the obtained luminance information of the image by the evaluation value detector 405.

Next, in Step S2, various parameters are calculated based on the evaluation values. In the case of the AE control, the exposure amount or the dynamic range is a factor of the AE control. Thus, these control parameters are calculated based on the AE evaluation values. Specifically, the following two parameter calculating steps can be raised as examples of Step S2.

(Step S2-1) Calculation of the exposure amount control parameter: The central control unit 50 calculates the exposure amount control parameter based on the AE evaluation values.

(Step S2-2) Calculation of the dynamic range control parameter: The central control unit 50 calculates the dynamic range control parameter based on the AE evaluation values.

Finally, in Step S3, the control parameters used to drive the respective parts of the digital camera 1 are set. In the case of the AE control, the control parameters are set based on Step S2-1 or Step S2-2. The following two steps of setting the parameter can be raised as examples of Step S3.

(Step S3-1) Setting of the exposure amount control parameter: The corresponding parameters are set in the memory portion 515, the control signal generator 520 and the like based on the calculated exposure amount control parameter, thereby operating the timing generating circuit 31 and the driving unit 60.

(Step S3-2) Setting of the dynamic range control parameter: The corresponding parameters are set in the memory portion 515, the control signal generator 520 and the like based on the calculated dynamic range control parameter, thereby operating the timing generating circuit 31.

(Basic Characteristic of the Image Sensor)

The aforementioned steps are described in detail one by one below. This embodiment premises the use of the image sensor 30 having, as its photoelectric conversion characteristics, the linear characteristic area where the electrical signal is outputted after being linearly converted in relation to the incident light amount and the logarithmic characteristic area where the electrical signal is outputted after being logarithmically converted in relation to the incident light amount. Thus, a specific example of the basic characteristic of the image sensor 30 is first described in detail.

Figure 7:
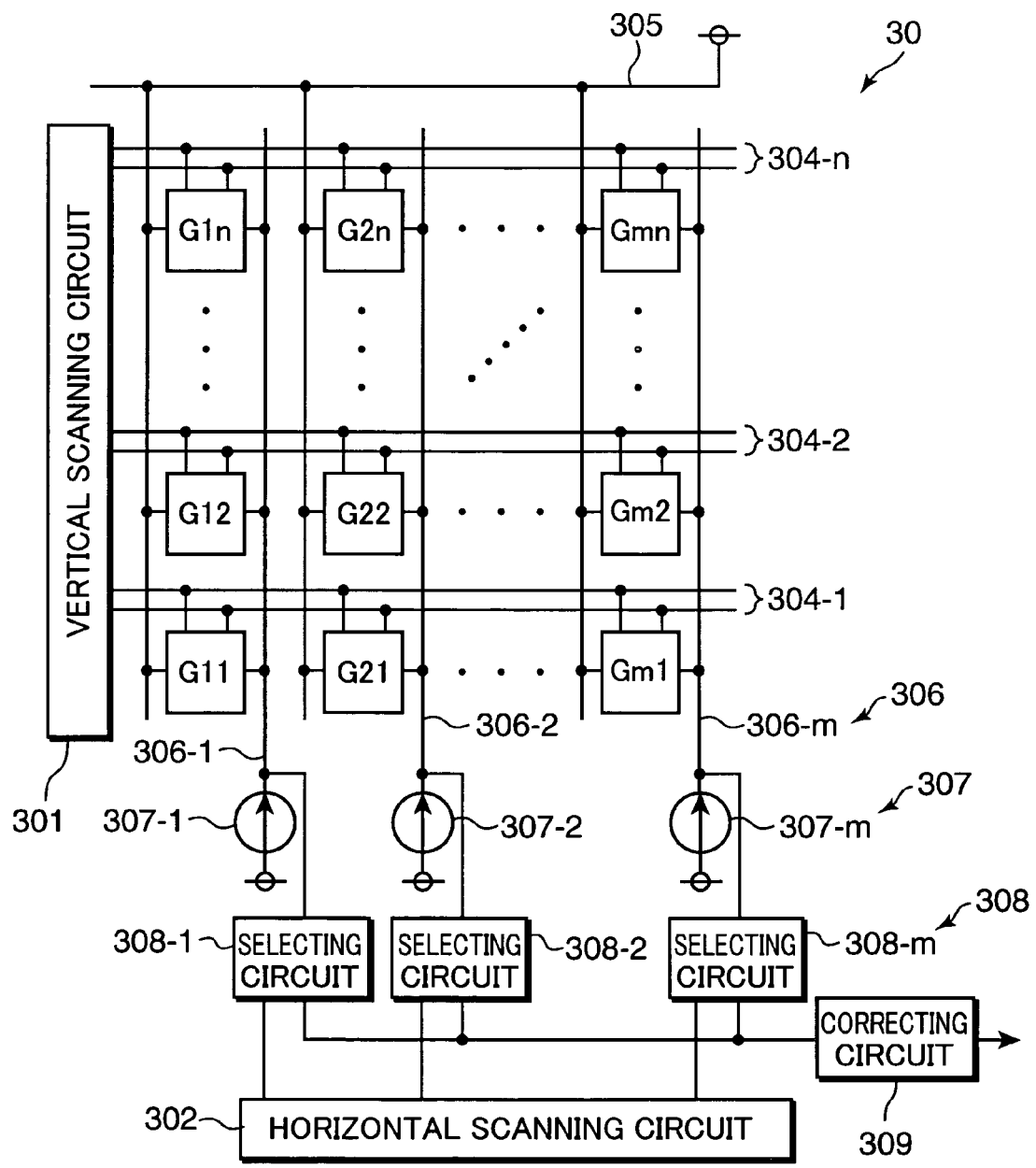
FIG. 7 is a schematic construction diagram of a two-dimensional MOS solid-state image sensing device as one example of the image sensor.

FIG. 7 is a schematic construction diagram of a two-dimensional MOS solid-state image sensing device which is one example of the image sensor 30. In FIG. 7, G11 to Gmn denote pixels arranged in matrix. A vertical scanning circuit 301 and a horizontal scanning circuit 302 are arranged near the outer periphery of a pixel section comprised of these pixels G11 to Gmn. The vertical scanning circuit 301 successively scans row lines (signal lines) 304-1, 304-2, ... 304-n (these are collectively called row lines 304). The horizontal scanning circuit 302 successively reads out photoelectrically converted signals introduced from the respective pixels to output signal lines 306-1, 306-2, ... 306-m (these are collectively called output signal lines 306) in horizontal direction pixel by pixel. Power is supplied to the respective pixels by a power-supply line 305. Although the respective pixels are connected with not only the row lines and the output signal signals, but also other lines (e.g., clock lines), the other lines are not shown in FIG. 7.

The output signal lines 306-1, 306-2, ..., 306-m are provided with constant-current supplies 307-1, 307-2, ..., 307-m (these are collectively called constant-current supplies 307) which are paired with transistors T5 to construct amplifying circuits. Instead of the constant-current supplies 307, resistors or transistors (MOS transistors) may be provided as the amplifying circuits. Image data of the respective pixels at the time of sensing which are outputted via the output signal lines 306 and correction data at the time of resetting are successively outputted to selecting circuits (sample-hold circuits) 308-1, 308-2, ..., 308-m (these are collectively called selecting circuits 308). The image data and the correction data are outputted row by row to the selecting circuits 308 to be sample-held. The sample-held image data and correction data are outputted column by column to a correcting circuit 309, where the image data are corrected based on the correction data so as to remove noise components due to a sensitivity variation. The image data having the sensitivity variation of the respective pixels corrected are serially outputted pixel by pixel from the correcting circuit 309.

Figure 8:
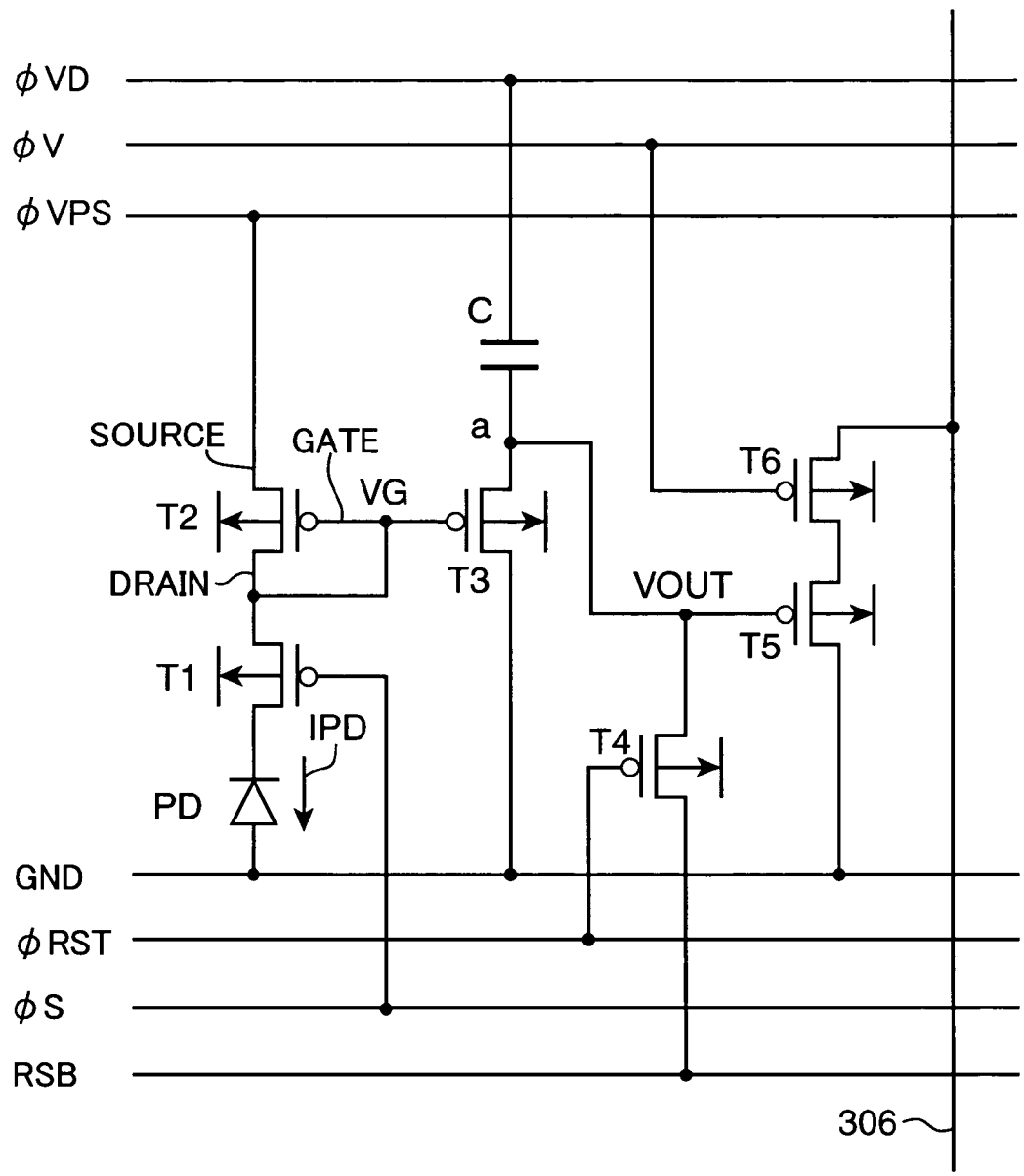
FIG. 8 is a circuit diagram showing a construction example of pixels G11 to Gmn shown in FIG. 7.

FIG. 8 is a circuit diagram showing a construction example of each pixel G11 to Gmn shown in FIG. 7. As shown in FIG. 8, one pixel is comprised of a photodiode PD, transistors T1 to T6 as MOSFETs (metal oxide semiconductor field effect transistors), and a capacitor C for integration. Here, P-channel MOSFETs are used as the transistors T1 to T6. φVD, φV, φVPS, φRST, φS and RSB denote signals (voltages) to be given to the respective transistors and the capacitor C, and GND denotes a ground.

The photodiode PD is a photosensitive device (photoelectric converting device) and outputs an electrical signal (light current IPD) corresponding to an amount of an incident light from a subject. The transistor T5 is paired with the constant-current supply 307 shown in FIG. 7 to construct the amplifying circuit (source-follower amplifier) for amplifying a source follower, and amplifies (current amplification) a voltage VOUT to be described later. The transistor T6 operates as a switch turned on and off in accordance with a voltage applied to a gate and is adapted to read a signal. In other words, a source of the transistor T6 is connected with the output signal line 306 shown in FIG. 7 and, when the transistor T6 is turned on, a current amplified by the transistor T5 is outputted to the output signal line 306 as an output current.

The transistor T2 generates, at a gate thereof, a voltage linearly or logarithmically converted in relation to the light current IPD. A minute current called subthreshold current flows in the MOSFET when a gate voltage is equal to or below a threshold value. The transistor T2 carries out the linear or logarithmic conversion taking advantage of this subthreshold characteristic.

Specifically, in the case that the luminance of a subject whose image is to be picked up is low (subject is dark), i.e., a small amount of a light is incident on the photodiode PD, the gate voltage of the transistor T2 is higher than a source voltage of the transistor T2, wherein the transistor T2 is in a so-called cut-off state. Thus, no subthreshold current flows in the transistor T2 (transistor T2 does not operate in a subthreshold area) and a light current generated in the photodiode PD flows into a parasitic capacitance of the photodiode PD, thereby storing electric charges, with the result that a voltage corresponding to the stored amount of electric charges is generated. Since the transistor T1 is on at this time, the voltage corresponding to the amount of the electric charges stored in the parasitic capacitance is generated as a voltage VG at the gates of the transistors T2 and T3. This voltage VG causes a current to flow in the transistor T3, and an amount of electric charges proportional to this voltage VG are stored in the capacitor C (the transistor T3 and the capacitor C construct an integrating circuit). A voltage linearly proportional to an integrated value of the light current IPD appears at a connection node "a" of the transistor T3 and the capacitor C, i.e., output VOUT. At this time, the transistor T4 is off. When the transistor T6 is turned on, the electric charges stored in the capacitor C are drawn out to the output signal line 306 as an output current via the transistor T5. This output current takes a value obtained by linearly converting the integrated value of the light current IPD. The above is the operation of the image sensor 30 in the linear characteristic area.

On the other hand, in the case that the luminance of a subject whose image is to be picked up is high (subject is bright), i.e., a large amount of a light is incident on the photodiode PD, the gate voltage of the transistor T2 is equal to or below the source voltage of the transistor T2, wherein the subthreshold current flows in the transistor T2 (transistor T2 operates in a subthreshold area) and a voltage VG taking a value obtained by natural-logarithmically converting the light current IPD is generated at the gates of the transistors T2, T3. This voltage VG causes a current to flow in the transistor T3, and an amount of electric charges equal to a value obtained by natural-logarithmically converting the integrated value of the light current IPD are stored in the capacitor C. In this way, a voltage proportional to the value obtained by natural-logarithmically converting the integrated value of the light current IPD is generated at the connection node "a" of the transistor T3 and the capacitor C (output VOUT). At this time, the transistor T4 is off. When the transistor T6 is turned on, the electric charges stored in the capacitor C are drawn out to the output signal line 306 as an output current via the transistor T5. This output current takes the value obtained by natural-logarithmically converting the integrated value of the light current IPD. The above is the operation of the image sensor 30 in the logarithmic characteristic area. In the above way, voltages linearly or natural-logarithmically proportional to the incident light amount (subject luminance) are outputted from the respective pixels.

The transistor T1 is a switch used to take out the noise data (noise signal created due to a variation in the production of the transistors T2) at the time of resetting. The transistor T1 is kept on except at the time of resetting, so that the light current IPD flows between (a drain of) the transistor T2 and the photodiode PD. At the time of resetting, the transistor T1 is kept off to shut off the light current IPD of the photodiode PD, and only the variation component is taken out. This variation component (noise signal) taken out is subtracted from a video signal to be described later.

The transistor T4 operates as a switch turned on and off in accordance with a voltage applied to a gate thereof and is for resetting the capacitor C. When the transistor T4 is turned on, a reset voltage (voltage of the signal RSB) is applied, whereby electric charges (amount of electric charges) stored in the capacitor C are reset to an initial state, i.e., state before the start of the integration.

Figure 9:
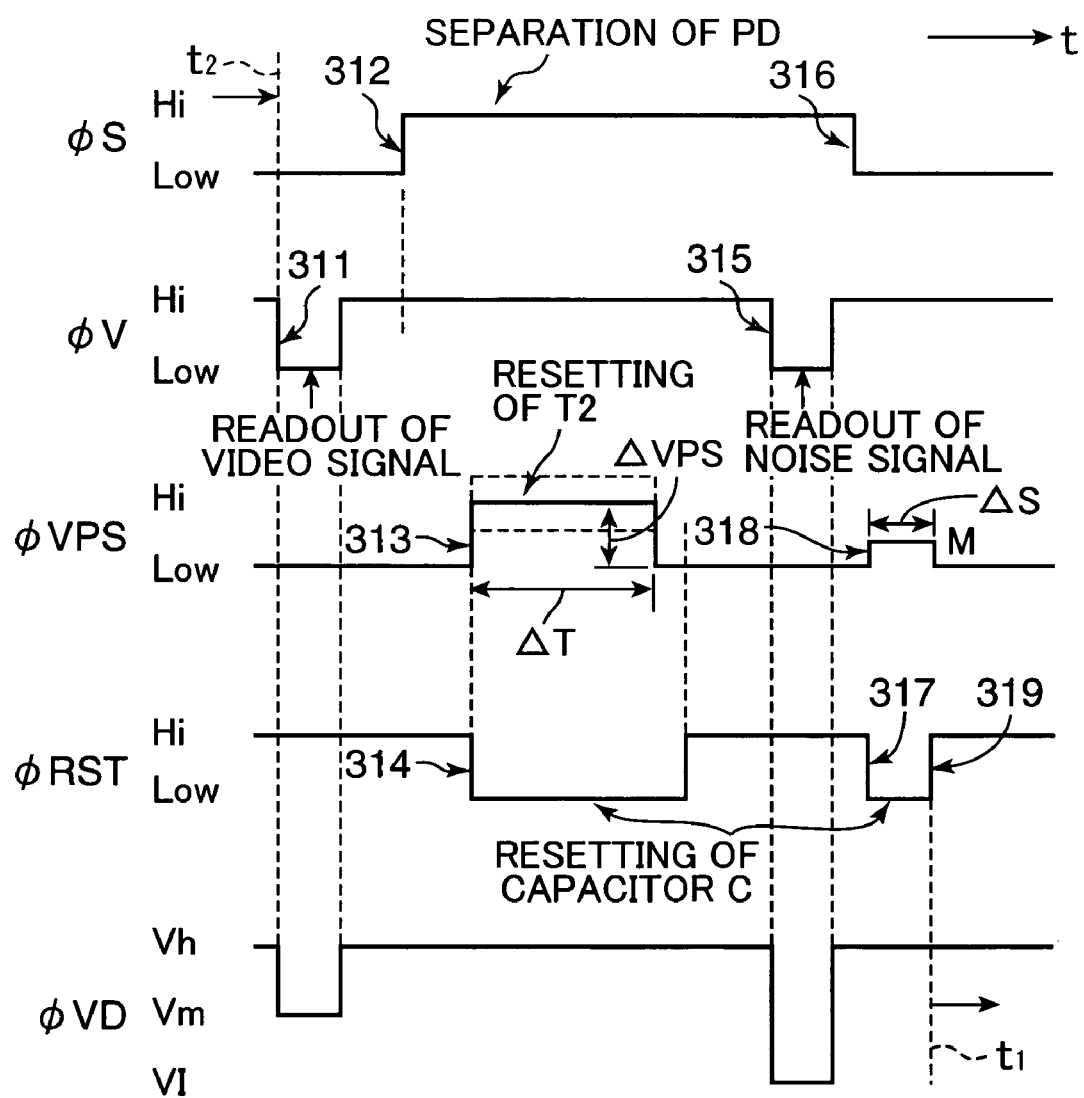
FIG. 9 is a timing chart showing an exemplary image sensing operation of the image sensor.

FIG. 9 is a timing chart showing an exemplary sensing operation of the image sensor 30 (pixel). Here, due to its polarity, the P-channel MOSFET is turned off at Hi (high) while being turned on at Low (low) as below. First, the signal φV falls to Low at position 311, whereby the transistor T6 is turned on to read out a video signal, i.e., to draw out the electric charges stored in the capacitor C to the output signal line 306 as an output current (video signal). Subsequently, the signal φS rises to Hi at position 312, whereby the transistor T1 is turned off to separate the photodiode PD. Then, the signal φVSP rises to Hi at position 313 to reset the transistor T2. Simultaneously with the resetting of the transistor T2, the signal φRST falls to Low at position 314, whereby the transistor T4 is turned on and a reset voltage by the signal RSB is applied to the capacitor C (connection node "a") (potential at the connection node "a" becomes a potential (VRSB) of the signal RSB), thereby resetting the capacitor C (electric charges). After the transistor T2 and the capacitor C are reset in this way, the signal φV falls to Low again at position 315, whereby the transistor T6 is turned on to draw out a noise signal to the output signal line 306.

Subsequently, the signal φS falls to Low at position 316 (transistor T1 is turned on), thereby canceling the separation of the photodiode PD. Then, the signal φVPS takes the medium potential M at position 318, thereby resetting the parasitic capacitance of the photodiode PD in order to reduce an afterimage. Further, in order to make an integration starting voltage for the next frame constant, the signal φRST falls to Low again at position 317 to turn the transistor T4 on, whereby the capacitor C is reset again.

Thereafter, the signal φVSP falls to Low from M at position 319, thereby ending the resetting of the parasitic capacitance of the photodiode PD. Simultaneously, the signal φRST rises from Low to Hi, thereby ending the resetting of the capacitor C. The integration of the capacitor C is started at this time t1 and continues up to position 311 where the signal φV falls from Hi to Low, i.e., till time t2 when the readout of the video signal in the next frame is started. A period between time t1 and time t2 is an integration period of the capacitor C, i.e., exposure period in the image pickup operation. The exposure period is controlled by controlling a period ΔS (duration) during which the signal φVPS, which takes the medium potential M, is given. This period ΔS is controlled by the sensor exposure period control signal generator 522 via the timing generating circuit 31.

The signal φVD is used to maneuver the potential in order to conform to the operation range of the amplifying circuit (source-follower amplifier) or to adjust offsets created in the video signal and the noise signal. Vh, Vm and Vl of the signal φVD denote high potential, medium potential and low potential, respectively.

The image sensor 30 can obtain an output signal linearly or logarithmically converted in accordance with the subject luminance as described above, and has a photoelectric conversion characteristic 320 as shown in FIG. 10. As shown in FIG. 10, the photoelectric conversion characteristic 320 is divided into a linear characteristic area and a logarithmic characteristic area with an inflection point 321 as a boundary. This inflection point 321 is a point where the linear characteristic area is switched to the logarithmic characteristic area, and Vth denotes a value of a sensor output at this inflection point 321. Generally, in the linear characteristic area, the gradation of the entire image can be made high (high contrast can be attained) although a subject having a wide luminance range cannot be photographed (dynamic range is narrow), and a high-quality image having a high gradation can be obtained even for a dark subject (e.g., subject in a cloudy weather or in shadow). On the other hand, in the logarithmic characteristic area, a subject having a wide luminance range can be photographed (dynamic range is wide) although gradation at high luminance is poor, and a high-quality image having a depth can be obtained even for a bright subject (e.g., subject illuminated by direct sunlight or having direct sunlight located behind) including a dark part.

Figure 11:
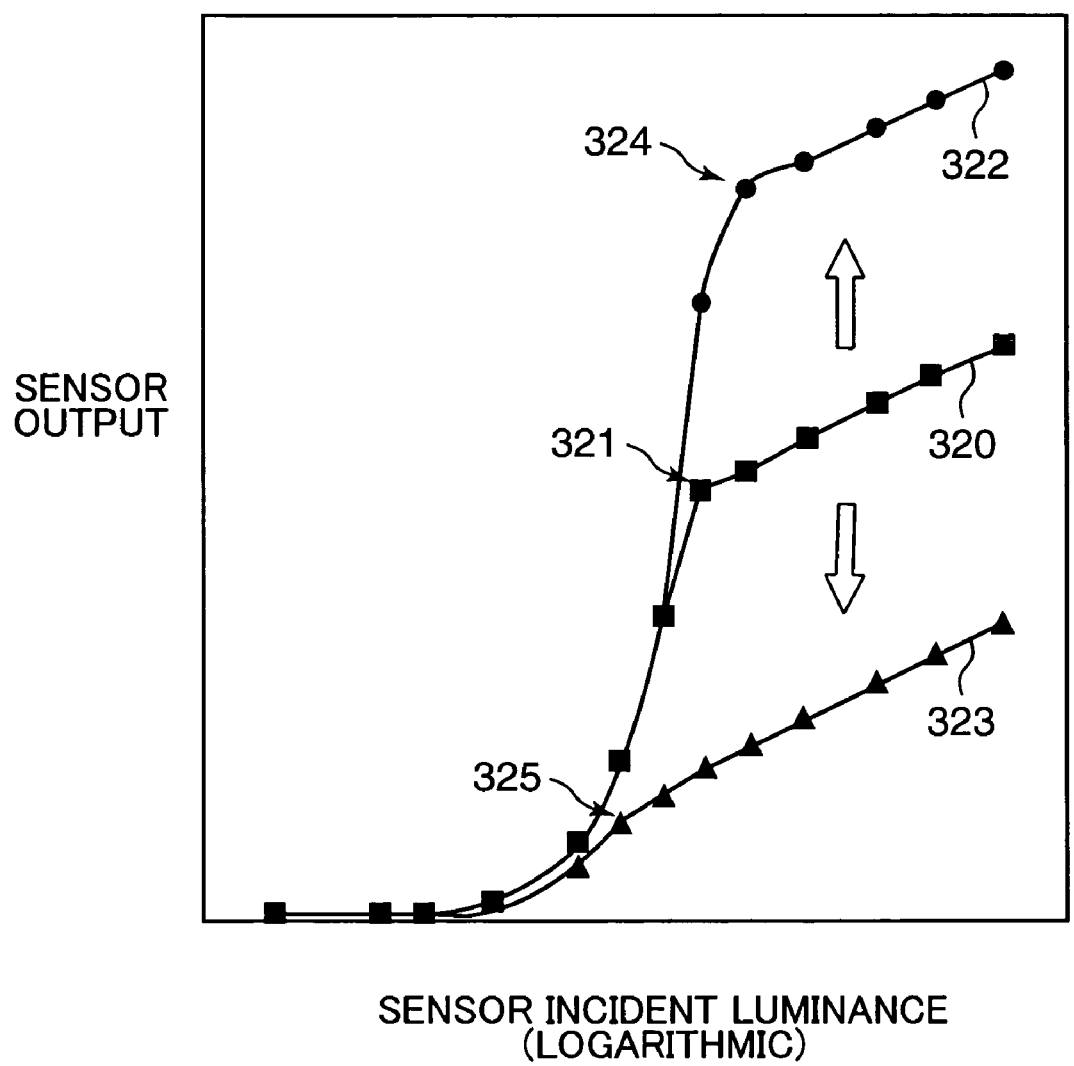
FIG. 11 is a graph showing changes of the photoelectric conversion characteristic.

The photoelectric conversion characteristic 320 (inflection point 321) can be changed (shifted) by changing a difference between Hi- and Low-voltages of the signal φVPS inputted to the source of the transistor T2. Specifically, if VPH, VPL denote voltages when the signal φVPS is high and low, respectively, the photoelectric conversion characteristic 320 (inflection point 321) can be arbitrarily changed to a photoelectric conversion characteristic 322 (inflection point 324) or a photoelectric conversion characteristic 323 (inflection point 325) as shown in FIG. 11 by changing a voltage difference ΔVPS (=VPH−VPL) (see FIG. 9). By changing the photoelectric conversion characteristic in this way, a ratio of the linear characteristic area to the logarithmic characteristic area changes, whereby a photoelectric conversion characteristic having a large ratio of the linear characteristic area as given by the photoelectric conversion characteristic 322 or a photoelectric conversion characteristic having a large ratio of the logarithmic characteristic area as given by the photoelectric conversion characteristic 323 can be obtained. In this case, a change may be made such that the entire photoelectric conversion characteristic is represented by the linear or logarithmic characteristic area.

In this embodiment, ΔVPS is changed by changing the voltage VPH, whereby the photoelectric conversion characteristic of the image sensor 30 is changed. In FIG. 11, the higher VPH (the larger ΔVPS), the larger the ratio of the linear characteristic area, and the photoelectric conversion characteristic changes toward the photoelectric conversion characteristic 322. The lower VPH (the smaller ΔVPS), the larger the ratio of the logarithmic characteristic area, and the photoelectric conversion characteristic changes toward the photoelectric conversion characteristic 323. This voltage VPH is controlled by the dynamic range control signal generator 521 via the timing generating circuit 31.

In order to change the photoelectric conversion characteristic as described above, the period ΔT during which the signal φVPS whose voltage becomes VPH is given may be changed. In such a case, the longer the period ΔT, the larger the ratio of the linear characteristic area, and the shorter the period ΔT, the larger the ratio of the logarithmic characteristic area. In FIG. 11, a case where the period ΔT is long corresponds to the photoelectric conversion characteristic 322, and a case where the period ΔT is short corresponds to the photoelectric conversion characteristic 323.

(Evaluation Value Detecting Step S1)

Next, specific methods for obtaining the evaluation values such as AE evaluation values in the evaluation value detector 405 of the signal processing unit 40 are described.

Figure 12:
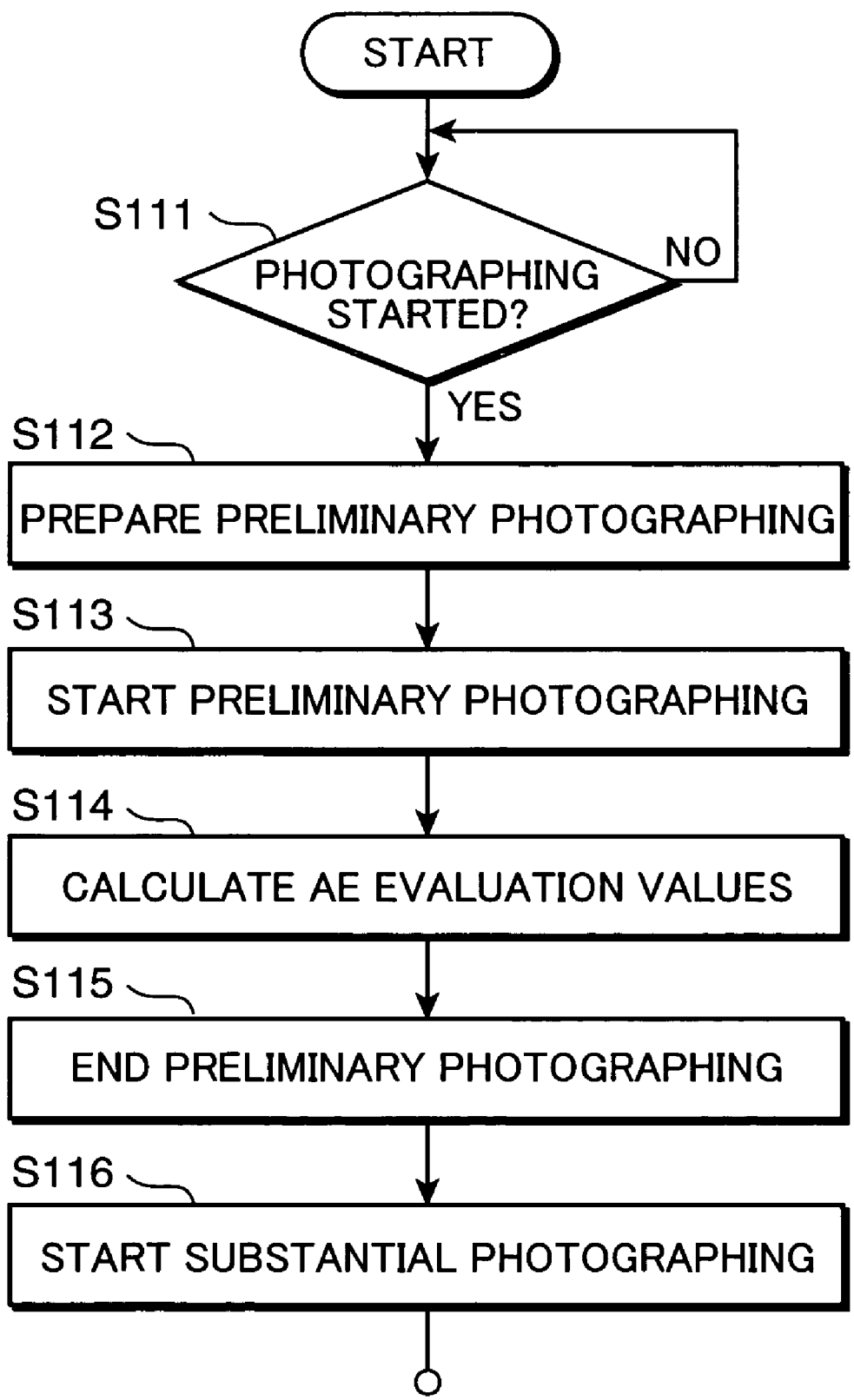
FIG. 12 is a flowchart showing an exemplary operation in the case of detecting AE evaluation values of a subject and the like from a still image the image sensor actually picked up.

(Step S1-1) Example of detecting evaluation values from a still image: FIG. 12 is a flowchart showing an exemplary operation in the case of detecting AE evaluation values of a subject from a still image actually picked up by the aforementioned image sensor 30. Specifically, in the case of photographing a still image (substantial photographing) using the electronic camera 1 of this embodiment, a still image used to obtain the AE evaluation values is picked up (preliminary photographing) prior to the substantial photographing, and the AE evaluation values are calculated based on this preliminarily picked-up image. FIG. 12 shows this flow. This evaluation value detecting technique is suitable for a digital single-lens reflex camera or the like image sensing apparatus of the type that a subject light image is incident on an optical viewfinder, but not on the image sensor 30 during the photographing preparation.

First, after the power switch 101 of the electronic camera 1 is pressed down to turn the electric camera 1 on, it is judged whether or not an operation for starting the photographing has been made (Step S111). When the release switch 102 is operated (e.g., pressed halfway) (YES in Step S111), an operation for preparing the preliminary photographing is started (Step S112).

In Step S112, the dynamic range control for the preliminary photographing is carried out upon performing the preliminary photographing to calculate the AE evaluation values. Here, the dynamic range control is executed such that the image sensor 30 has a maximum dynamic range so as to be able to sense the luminance of a subject in a wide range. In other words, since there is only one chance of the preliminary photographing before the substantial photographing in a digital single-lens reflex camera or the like, a wide dynamic range is set so that the luminance of any subject can be securely detected.

To this end, the operative state of the image sensor 30 is controlled such that the image sensor 30 logarithmically converts its output in the entire area. Specifically, when the release switch 102 is pressed halfway, an instruction to transit to a preliminary photographing mode is sent to the respective parts from the central control unit 50 and, upon receiving such an instruction, the dynamic range control signal generator 521 generates a signal for changing, e.g., a difference between the Hi- and Low-voltages of the signal φVPS inputted to the source of the transistor T2 shown in FIG. 8 (in this case, the aforementioned ΔVPS is made smaller: see FIG. 9), thereby executing such a control as to increase the ratio of the logarithmic characteristic area of the image sensor 30. Although it is desirable to set the entire area as the logarithmic characteristic area in order to ensure a wide dynamic range, the entire area may not be necessarily set as the logarithmic characteristic area, and the linear characteristic area may be left to a certain extent.

Subsequently, an exposure control for the preliminary photographing is carried out to perform the preliminary photographing (Step S113). Specifically, the sensor exposure period control signal generator 522, for example, generates a drive signal for setting the duration of the period ΔS during which the signal φVPS takes the medium potential M in conformity with a specified exposure period, and sends it to the timing generating circuit 31, whereby the exposure control (exposure amount control) for preliminary photographing of the image sensor 30 is carried out. In addition, the exposure control is carried out by adjusting the shutter speed of the shutter 23 by means of the shutter driving section 61 in accordance with a control signal generated by the shutter control signal generator 523 and by adjusting the diaphragm 22 by means of the diaphragm controller 63 in accordance with a control signal generated by the diaphragm control signal generator 525. After such an exposure control is made, a still image is preliminarily picked up. Thus, the evaluation value detector 405 calculates the AE evaluation values based on the preliminarily picked-up image (Step S114). This AE evaluation value calculating step is described in detail later. The preliminary photographing ends (Step S115) upon calculating the AE evaluation values, and the substantial photographing is started (Step S116) after the exposure control is carried out based on the AE evaluation values. Although the above description is made on the case of obtaining the AE evaluation values, the AF evaluation values and the WB evaluation values can be similarly obtained.

Figure 13:
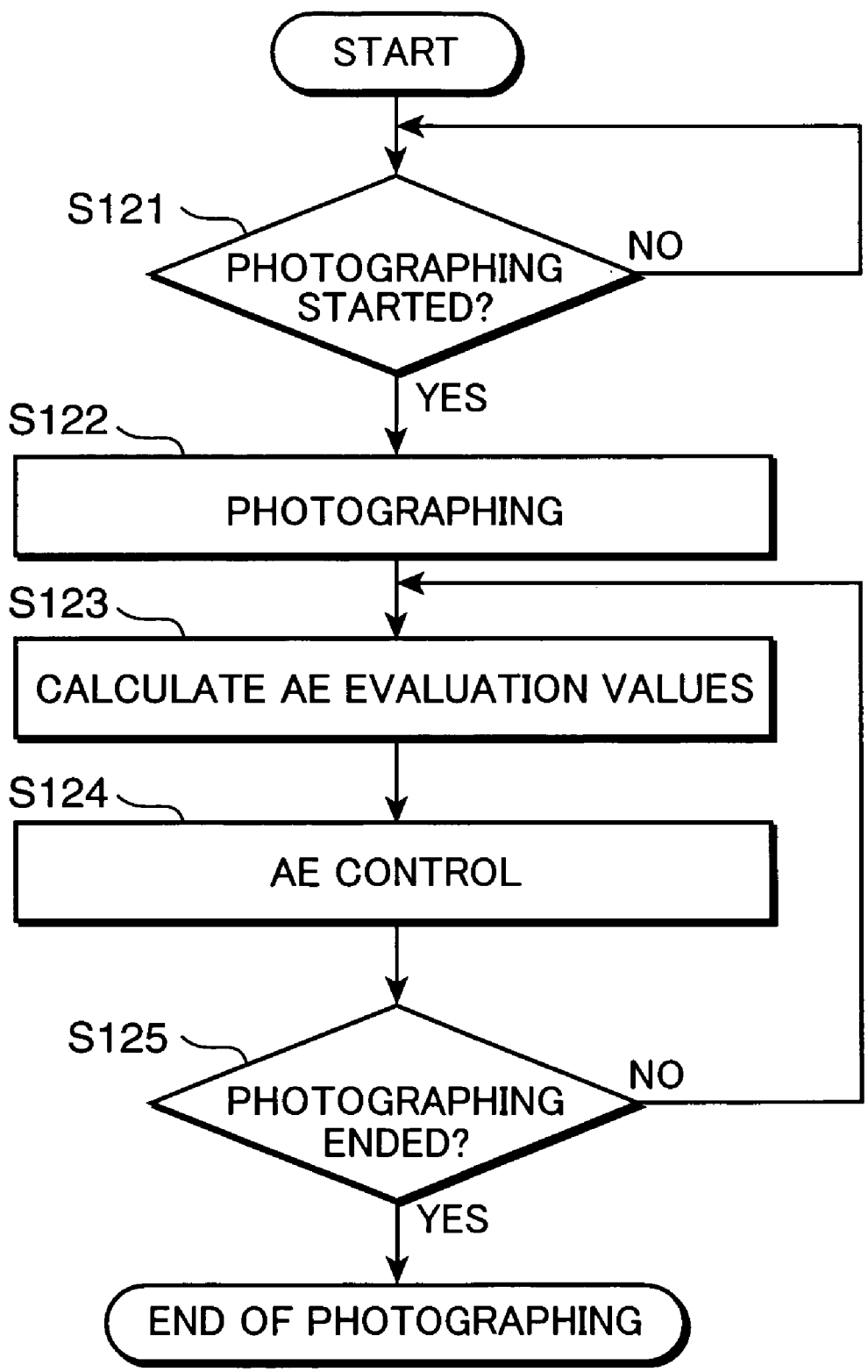
FIG. 13 is a flowchart showing an exemplary operation in the case of detecting AE evaluation values of a subject and the like from moving images the image sensor is successively picking up.

(Step S1-2) Example of Detecting Evaluation Values from Moving Images:

FIG. 13 is a flowchart showing an exemplary operation in the case of detecting the AE evaluation values and the like of a subject from moving images successively picked up by the image sensor 30. Specifically, in the case that the electronic camera 1 waits on standby for the photographing or in the moving-picture photographing mode or the image sensing apparatus is applied to a digital movie, the AE evaluation values are calculated using all the frame images picked up by the image sensor 30. FIG. 13 shows this flow.

First, it is judged whether or not an operation for starting the photographing has been made (Step S121). When the mode setting switch 105 is, for example, operated to enter the moving-image photographing mode and the start of the photographing is confirmed (YES in Step S121), the photographing of moving images is started (Step S122). The respective control values such as the image sensing dynamic range, exposure period and aperture value at the time of starting the photographing are set to initial values.

Subsequently, the evaluation value detector 405 calculates the AE evaluation values based on the images picked up in Step S122 (Step S123). Based on the detected AE evaluation values, the dynamic range control signal generator 521 changes the setting of the signal φVPS to control the dynamic range, and the shutter 23 and the diaphragm 22 are controlled by control signals generated by the shutter drive signal generator 523 and the diaphragm control signal generator 525, whereby a specified AE control is carried out (Step S124).

It is then judged whether or not the photographing has ended (Step S125). In the case of receiving no instruction to end the photographing (NO in Step S125), this routine returns to Step S123 to repeat the similar calculation of the AE evaluation values and the AE control in Step S124. In other words, when moving images are photographed, all the picked-up images are used as evaluation images for detecting the AE evaluation values, and the AE control for the next photographing is carried out based on the obtained AE evaluation values. This cycle is repeated. Instead of using all the picked-up images as evaluation images, some of the picked-up images (e.g., one out of several frames of picked-up images) may be used as evaluation images and the AE evaluation values may be obtained from these evaluation images.

Figure 14:
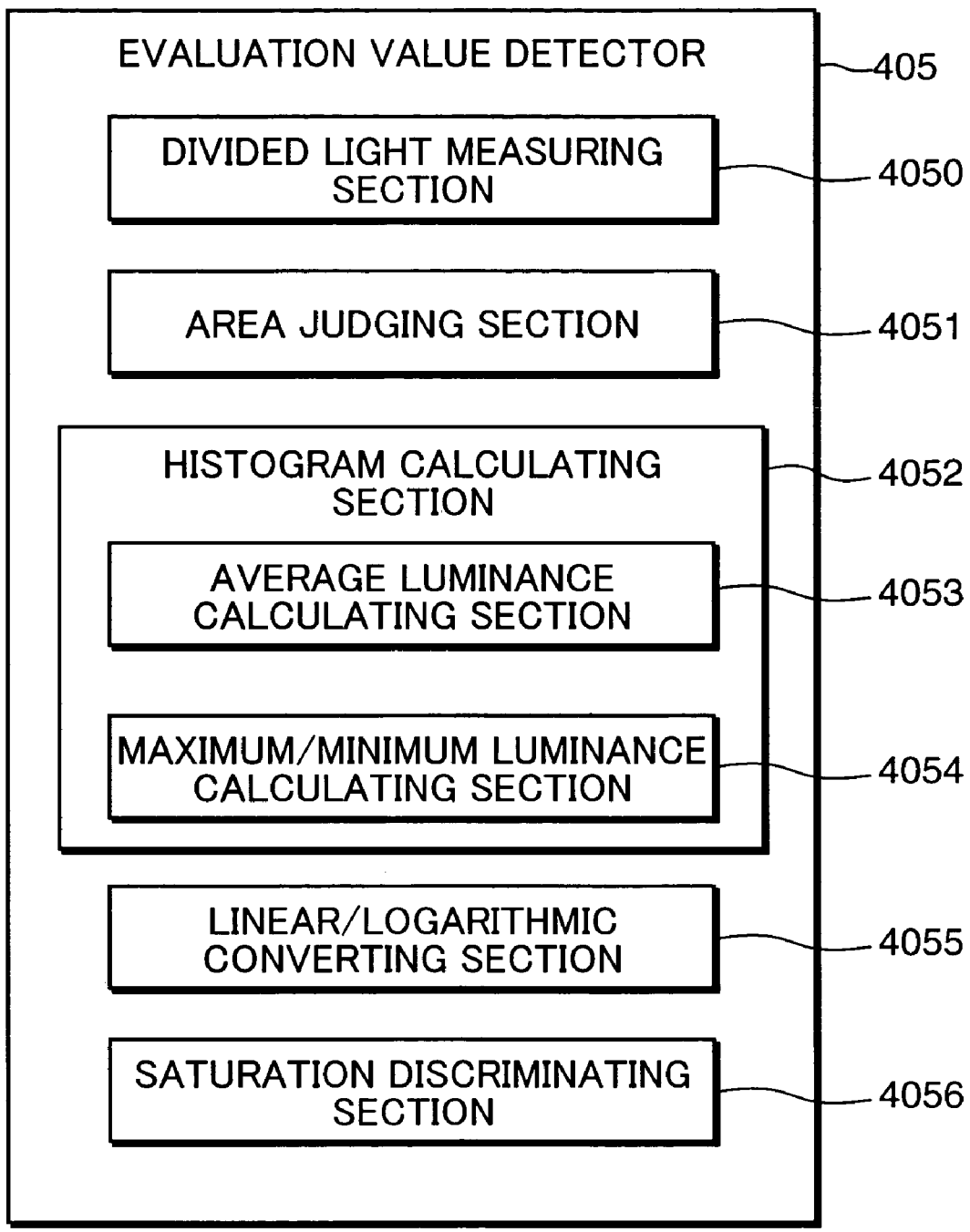
FIG. 14 is a function block diagram showing functions of an evaluation value detector.

(Step S1-3) Calculation of Evaluation Values:

Next, the evaluation value calculating steps (Steps S114, S123) in the above flows are described in detail. FIG. 14 is a function block diagram showing functions of the evaluation value detector 405. The evaluation value detector 405 includes a divided light measuring section 4050, an area judging section 4051, a histogram calculating section 4052, a linear/logarithmic converting section 4055, and a saturation discriminating section 4056.

The divided light measuring section 4050 performs a light measurement for a subject using a divided light measuring (multi-pattern light measuring) system. Specifically, the divided light measuring section 4050 divides the picked-up image obtained by the image sensor 30 into a specified number of areas (sections), and detects luminance in this picked-up image (respective areas or sections) from an image signal (image data). FIG. 15 is a diagram showing a divided state of a sensing area (light measurement range) upon a divided light measurement by the image sensor 30. Identified by 330 is a sensing area (image sensing area 330) obtained by the image sensor 30, and a subject is picked up (sensed) in this sensing area 330. A multitude of pieces of pixel information, i.e., subject luminance information corresponding to image sensing elements forming the image sensor 30 are contained in this sensing area 330. The image sensing area 330 is, for example, divided into a center area located in the center of the sensing area 330 and a peripheral area around this center area, and the center area and the peripheral area are divided into specified numbers of detection blocks (detection sections), respectively. The center area is, for example, divided into 36 detection blocks of A, B, C, . . . , Z, AA, AB, . . . AJ (A to AJ blocks), and the peripheral area is divided into 16 detection blocks of first to sixteenth blocks. In this embodiment, a subject sensed in this center area is called a main subject (hereinafter, the center area is referred to as a main subject area 331), and a subject sensed in the peripheral area is called a peripheral subject (hereinafter, the peripheral area is referred to as a peripheral subject area 332). An area formed by the blocks O, P, U and V in the central part of the main subject area 331 serves as an AF area 333 where the AF evaluation values are detected for focusing control. Luminance (of the picked-up image) in the main subject area 331 is referred to a main subject luminance, whereas the one in the peripheral subject area 332 is referred to as a peripheral subject luminance.

The area judging section 4051 judges whether the luminance information of the subject obtained from each pixel of the image sensing area 330 is luminance information in the linear characteristic area or the one in the logarithmic characteristic area. In practice, to which of the linear characteristic area or the logarithmic characteristic area the subject luminance (luminance information) belongs is judged by discriminating whether an output level of the subject luminance from each pixel (image sensing element) is larger than an output level at the inflection point of the photoelectric conversion characteristic. In this way, the area judging section 4051 detects whether the luminance information of the subject corresponds to the linear characteristic area or to the logarithmic characteristic area. Thus, the respective evaluation values (AE evaluation values, AF evaluation values, WB evaluation values) calculated using this subject luminance information can be distinguished as those corresponding to (detected from) the linear characteristic area and as those corresponding to the logarithmic characteristic area.

Figure 16A:
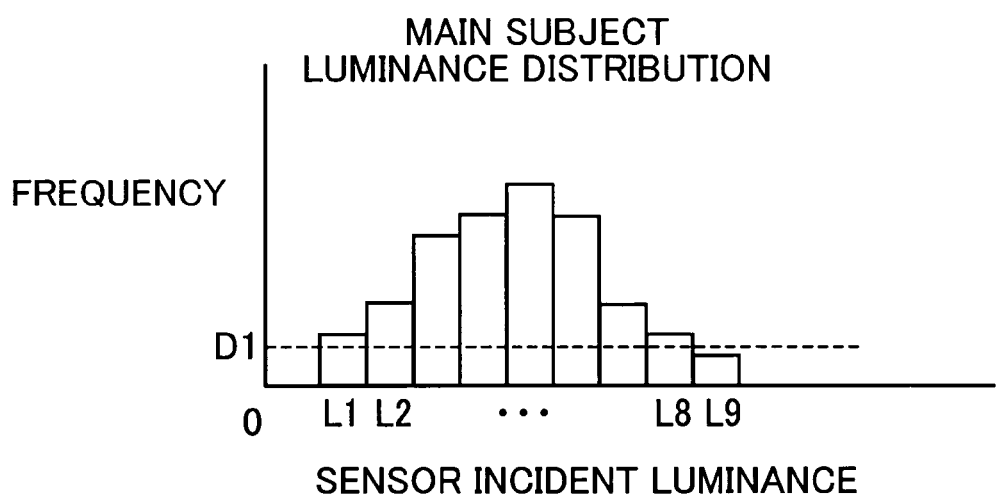
FIGS. 16A and 16B are graphs showing exemplary whole luminance histograms of a main subject and a peripheral subject, respectively.
Figure 16B:
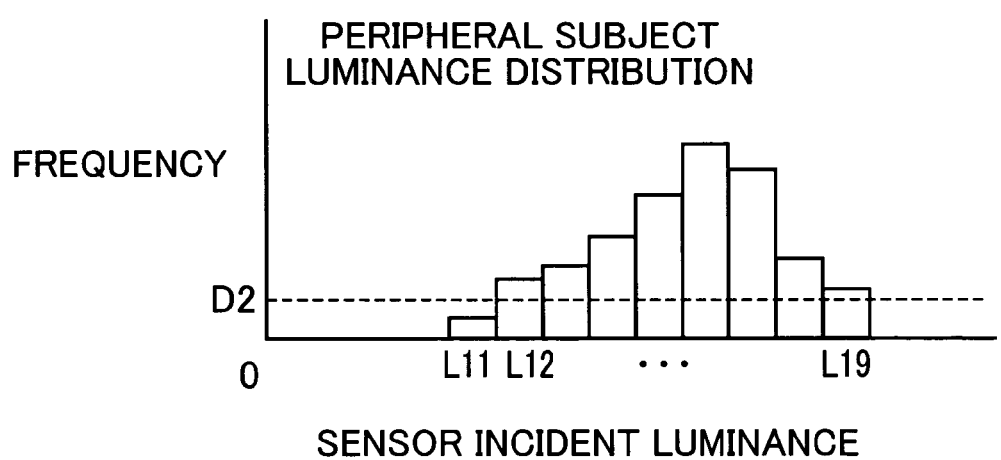

The histogram calculating section 4052 calculates a main subject luminance histogram (distribution) for each block A to AJ, and calculates a main subject whole luminance histogram in the entire main subject area 331 as shown in FIG. 16A using the main subject luminance histograms of the blocks A to AJ. The histogram calculating section 4052 also calculates a peripheral subject luminance histogram for each of the first to the sixteenth blocks, and calculates a peripheral subject whole luminance histogram in the entire peripheral subject area 332 as shown in FIG. 16B using the peripheral subject luminance histograms of the first to sixteenth blocks.

The histogram calculating section 4052 also calculates a luminance range of the entire main subject and a luminance range of the entire peripheral subject using the calculated main subject whole luminance histogram and peripheral subject whole luminance histogram. Upon this calculation, Gaussian pruning is applied using a specified threshold value, i.e., luminance data having frequencies smaller than this threshold value are not used. For the main subject, the luminance data is cut back at a threshold value D1 as shown in FIG. 16A, and a range defined by a minimum value L1 and a maximum value L8 of luminances having frequencies equal to or above D1 is set as a main subject entire luminance range. Similarly, for the peripheral subject, the luminance data is cut back at a threshold value D2 as shown in FIG. 16B, and a range defined by a minimum value L12 and a maximum value L19 of luminances having frequencies equal to or above D2 is set as a peripheral subject entire luminance range. This Gaussian pruning using the threshold values is for reducing errors caused by noise or the like. Although the luminances of the respective luminance histograms shown in FIGS. 16A and 16B are identified by L1 to L19 here for the sake of convenience, they are actually expressed in 256 stages (gradations) and can be identified by L1 to L256, for example, in the case of handling an image data of eight bits.

The histogram calculating section 4052 includes an average luminance calculator 4053 and a maximum/minimum luminance calculator 4054. The average luminance calculator 4053 calculates an average luminance of the main subject in each block A to AJ and an average luminance of the peripheral subject in each of the first to sixteenth blocks. This average luminance is calculated for each of the colors R, G, B. In the calculation of the average luminances, the main subject luminance histograms and the peripheral subject luminance histograms are calculated for the blocks A to AJ and for the first to sixteenth blocks, and the luminance data are cut back using specified threshold values in a manner similar to the above, and each average luminance is obtained by averaging the respective luminance values after this Gaussian pruning. In the actual average luminance calculation, the average luminance calculator 4053 calculates an average luminance of each block obtained by adding average luminances of the respective colors R, G and B in the linear and logarithmic characteristic areas (by a color space conversion to be described later or the like), an average luminance of the entire blocks A to AJ, i.e., the entire main subject area 331 (or all the first to sixteenth blocks; entire peripheral subject area 332) in the linear and logarithmic characteristic areas, an average luminance value in the entire image (image sensing area 330), or the like.

The maximum/minimum luminance calculator 4054 calculates the maximum/minimum luminances of the main subject for the respective blocks A to AJ and maximum/minimum luminances of the peripheral subject for the respective first to sixteenth blocks. In this case as well, the luminance data of the main subject luminance histogram and peripheral subject luminance histogram calculated for the respective blocks are cut back at the specified threshold values, and the maximum or minimum luminance is calculated based on the respective luminance values (luminance range) after the Gaussian pruning. In actual maximum/minimum luminance calculation, similar to the above, the maximum/minimum luminance calculator 4054 calculates maximum/minimum luminances of each block obtained by adding maximum/minimum luminances of the respective colors R, G and B in the linear and logarithmic characteristic areas (by a color space conversion to be described later or the like), maximum/minimum luminances of all the A to AJ blocks (or all the first to sixteenth blocks) in the linear and logarithmic characteristic areas, maximum/minimum luminances in the entire image, or the like.

The histogram calculating section 4052 calculates an entire-area luminance histogram in the entire image sensing area (image sensing area 330), which is a sum of the main subject area 331 and the peripheral subject area 323, in order to be used for the saturation discrimination by the saturation discriminating section 4056 to be described later. This entire-area luminance histogram may be calculated by combining the main subject whole luminance histogram and the peripheral subject whole luminance histogram.

Figure 19:
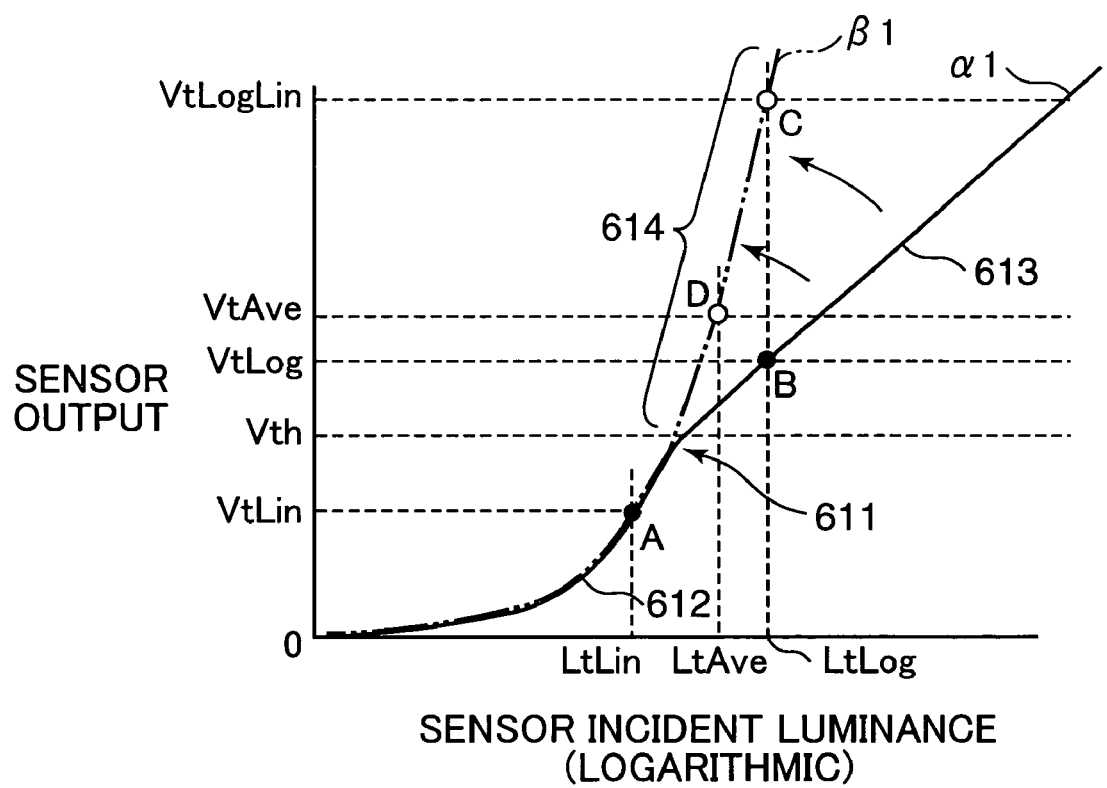
FIG. 19 is a graph showing a linear conversion process upon calculating an exposure amount control parameter.

The linear/logarithmic converting section 4055 standardizes, if necessary, the luminance information of the subject into the one corresponding to either one of the linear characteristic area and the logarithmic characteristic area by applying a specified data conversion to the luminance information of the subject in the other area. Specifically, output levels of the subject luminance corresponding to one of the linear characteristic area and the logarithmic characteristic area are converted into those corresponding to the characteristic of the other area using a LUT for this data conversion saved in the LUT storage 518. For example, a data conversion is carried out such that the subject luminance information (sensor output) corresponding to the logarithmic characteristic area 613 becomes the subject luminance information (sensor output) corresponding to the linear characteristic area 614 as shown in FIG. 19 to be described later (in other words, such a photoelectric conversion characteristic $\beta 1$ entirely located in the linear characteristic area is calculated).

The saturation discriminating section 4056 discriminates whether or not an output of the image sensor 30 is saturated at the time of detecting the AE (AF, WB) evaluation values based on the entire-area luminance histogram calculated by the histogram calculating section 4052.

Figure 17:
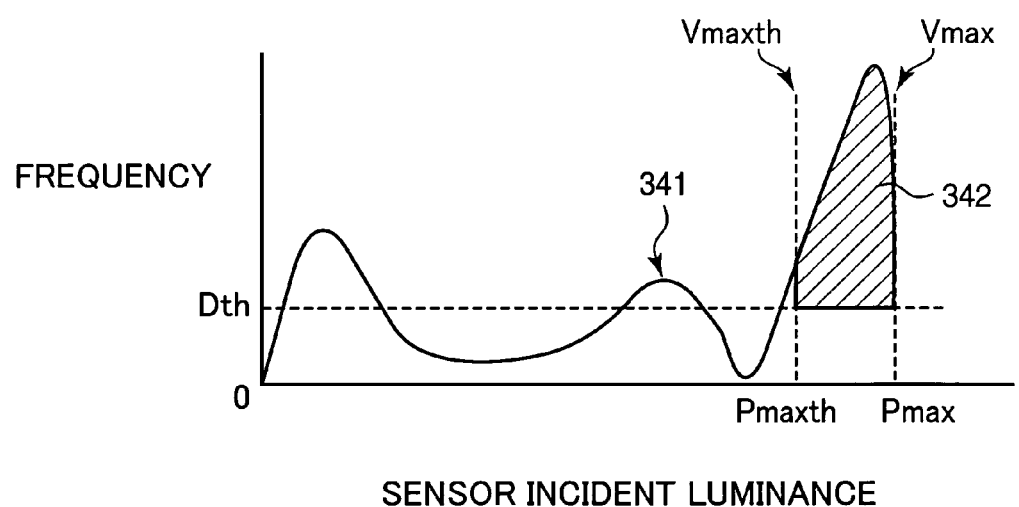
FIG. 17 is a graph showing an exemplary total area histogram when an output of the image sensor is saturated.

FIG. 17 is a graph showing an exemplary entire-area luminance histogram (distribution curve) when the output of the image sensor 30 is saturated. Pmax in FIG. 17 denotes a sensor incident luminance (saturation luminance) when the image sensor 30 is at a saturated output level Vmax (maximum value of the output level of the image sensor 30), and Pmaxth denotes a sensor incident luminance (luminance threshold value) at a sensor output Vmaxth set as a specified threshold value for discriminating whether the output of the image sensor 30 is saturated or not. Further, Dth denotes a frequency (frequency threshold value) set as a threshold value beforehand for the same purpose of discriminating whether or not the output of the image sensor 30 is saturated or not. Vmax may be a saturated output level as an actual maximum output level or an arbitrarily set saturated output level (e.g., output level slightly lower than the actual maximum output level).

The saturation discriminating section 4056 calculates, in the entire-area luminance histogram 341, a total frequency, i.e., a total number of pixels in a hatched area (saturation area 342) identified by 342 in FIG. 17, where the luminance data are equal to or above the luminance threshold value Pmaxth and equal to or above the frequency threshold value Dth. If the total number of the saturated pixels is equal to or above a specified number, the output level of the image sensor 30 is discriminated to be saturated (it is discriminated not to be saturated if the total number is below the specified number). The discrimination as to whether or not the output level is saturated may be made using only the frequency (pixel number) at the saturation luminance Pmax.

The evaluation value detector 405 detects information including the average luminances, maximum/minimum luminances, luminance histograms or luminance ranges as the AE (AF, WB) evaluation values from the luminance information (image data) in the respective detection blocks of the main subject area and the peripheral subject area obtained by aforementioned divided light measurement. This evaluation value data is outputted via the information receiver 501 to the parameter calculating sections of the operating section 510 corresponding to the various evaluation values such as the AE control parameter calculating sections 5110 in the case of the AE evaluation values, the AF control parameter calculating section 513 in the case of the AF evaluation values, and the WB control parameter calculating section 514 in the case of the WB evaluation values, and various control parameters are calculated based on the evaluation values in the respective calculating sections.

(AE Control Parameter Calculating Step S2)

Figure 18A:
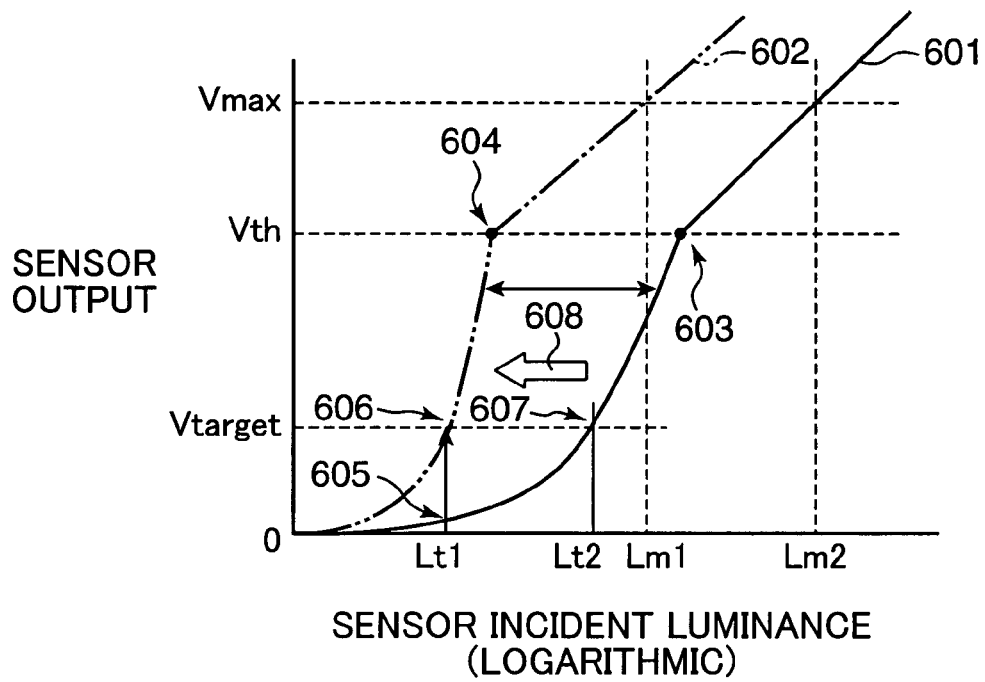
Figure 18B:
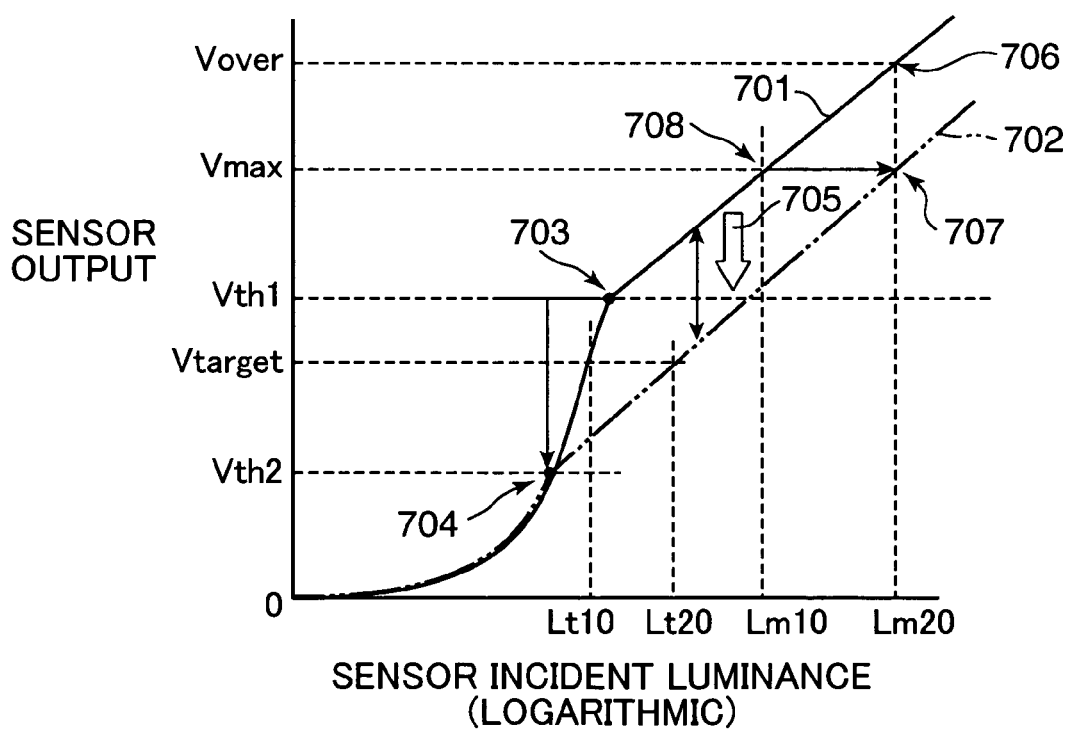

Next, the AE control by the exposure amount control and the dynamic range control based on the photoelectric conversion characteristic of the image sensor 30 in this embodiment is described in detail below. FIGS. 18A and 18B are graphs showing changed states of the photoelectric conversion characteristic of the image sensor 30 in the case of carrying out the AE control, wherein FIG. 18A shows a change in the case of executing the exposure amount control and FIG. 18B shows a change in the case of executing the dynamic range control. In FIGS. 18A, 18B, horizontal axis represents sensor incident luminance and vertical axis represents sensor output, wherein the horizontal axis is a logarithmic axis (logarithmic values of the sensor incident luminances). It should be noted that the sensor incident luminance is the luminance of the subject incident on the image sensor 30 and is referred to merely as luminance hereinafter.

The AE control according to this embodiment is carried out by the exposure amount control in accordance with the photoelectric conversion characteristic and the dynamic range control in accordance with the photoelectric conversion characteristic. Specifically, the AE control is carried out by the following controls (A) and (B).

(A) The exposure amount control by controlling the exposure period in the shutter 23 and/or the image sensor 30, i.e., the opening period of the shutter 23 and/or the integration period of the image sensor 30, and/or the aperture area of the diaphragm 22.

(B) The dynamic range control by controlling the photoelectric conversion characteristic of the image sensor 30 (specifically, controlling the position of the inflection point of the photoelectric conversion characteristic; see FIG. 22).

(Step S2-1) Calculation of the Exposure Amount Control Parameter:

First, the exposure amount control in the case (A) is described with reference to FIG. 18A. A photoelectric conversion characteristic 601 is a photoelectric conversion characteristic of the image sensor 30 saved in the photoelectric conversion characteristic information storage 516 at the time of obtaining the AE evaluation values. The photoelectric conversion characteristic 601 is divided into a linear characteristic area and a logarithmic characteristic area with an inflection point 603 (sensor output at this time is Vth) as a boundary. The exposure amount control parameter calculating section 511 calculates an exposure amount control parameter (exposure amount set value) for obtaining an exposure amount which causes this photoelectric conversion characteristic 601 to change to a photoelectric conversion characteristic 602 with which a specified sensor output can be obtained in relation to a specified luminance for setting the exposure amount (exposure amount setting luminance), i.e., the exposure period set value for controlling the exposure period and the aperture set value for controlling the aperture area of the diaphragm.

Here is calculated such a photoelectric conversion characteristic 602 that a value of the sensor output (sensor output at point 605) corresponding to a specified luminance Lt1 (corresponding to the exposure amount setting luminance) in the linear characteristic area of the photoelectric conversion characteristic 601 takes Vtarget (sensor output at point 606). In other words, the photoelectric conversion characteristic 601 is changed (shifted) in a direction of arrow identified by 608 (arrow direction 608) to the photoelectric conversion characteristic 602 passing point 606 (at this time, the inflection point 603 is shifted in parallel to an inflection point 604 and the value of the sensor output Vth does not change). Vtarget is a target output, which is a certain target of the sensor output, and is a preset value. Vtarget is saved in the exposure amount control parameter calculating section 511 or the like.

In this case, there are calculated the exposure period set value and the aperture set value capable of increasing the exposure amount so that the sensor output at luminance Lt1 increases from the one at point 605 of the photoelectric conversion characteristic 601 to the sensor output (Vtarget) at point 606 of the photoelectric conversion characteristic 602, i.e., the sensor output corresponding to the same luminance increases. Seen differently, the exposure amount control parameter calculating section 511 calculates such exposure period set value and aperture set value that the luminance corresponding to Vtarget changes from Lt2 (luminance at point 607) to Lt1, i.e., Lt1 lower than Lt2 is sufficient to obtain the sensor output at Vtarget. At this time, a control is carried out based on the exposure period set value and the aperture set value, such that the opening period of the shutter 23 or the integration period of the image sensor 30 is increased, and the aperture area of the diaphragm 22 is increased.

In the case of changing from the photoelectric conversion characteristic 601 to the photoelectric conversion characteristic 602, luminance at Vmax changes (decreases) from Lm2 to Lm1 and the dynamic range is reduced. Vmax is a maximum value of the sensor output of the image sensor 30, i.e., a saturated output level. However, Vmax may be a saturated output level as a physically maximum output level or an arbitrarily set saturated output level (e.g., as an output level slightly lower than the physically maximum output level).

Although the photoelectric conversion characteristic is changed in the arrow direction 608 in order to obtain Vtarget in relation to the exposure amount setting luminance (Lt1) in the case of FIG. 18A, it may be changed (shifted) in a direction (rightward direction) opposite from the arrow direction 608. The photoelectric conversion characteristic is not changed (shifted) if Vtarget can be already obtained in relation to the exposure amount setting luminance as described above with the photoelectric conversion characteristic at the time of obtaining the AE evaluation values. However, in such a case, even if the exposure period set value and the aperture set value take the same values as those when the AE evaluation values were obtained last time, the exposure period set value and the aperture set value may be calculated this time.

(Step S2-2) Calculation of Dynamic Range Control Parameter:

Next, the dynamic range control in the case (B) is described with reference to FIG. 18B. A photoelectric conversion characteristic 701 is a photoelectric conversion characteristic of the image sensor 30 saved in the photoelectric conversion characteristic information storage 516 at the time of obtaining the AE evaluation values. The photoelectric conversion characteristic 701 is divided into a linear characteristic area and a logarithmic characteristic area with an inflection point 703 (sensor output at this time is Vth1) as a boundary. The dynamic range control parameter (photoelectric conversion characteristic set value) is calculated as such a control value for the photoelectric conversion characteristic that the photoelectric conversion characteristic 701 changes to a photoelectric conversion characteristic 702 with which a specified sensor output can be obtained in relation to a specified luminance for setting the dynamic range (dynamic range setting luminance), specifically as a set value concerning the position of an inflection point 704 of the photoelectric conversion characteristic (702) after the change. This photoelectric conversion characteristic set value is calculated by the dynamic range control parameter calculating section 512.

Here, luminance Lm20 set as a maximum luminance in the dynamic range is assumed to be the dynamic range setting luminance, and the photoelectric conversion characteristic 702 is calculated such that a value of the sensor output corresponding to the luminance Lm20 takes Vmax as a saturated output level of the image sensor 30 (similar to Vmax shown in FIG. 18A). In other words, the photoelectric conversion characteristic 701 is changed in a direction of arrow identified by 705 (arrow direction 705) to the photoelectric conversion characteristic 702 passing the point 704. At this time, the inflection point 703 is shifted to the inflection point 704, and the sensor output at the inflection point is also changed from Vth1 to Vth2.

In this case, there is calculated such a photoelectric conversion characteristic set value that the sensor output at luminance Lm20 decreases from a sensor output at point 706 (Vover: sensor output value exceeding Vmax) to a sensor output at point 707 (Vmax). Seen differently, the dynamic range control parameter calculating section 512 calculates such a photoelectric conversion characteristic set value that a maximum luminance capable of obtaining the sensor output Vmax increases from Lm10 (luminance at point 708) to Lm20 (to widen the dynamic range).

In the case of changing from the photoelectric conversion characteristic 701 to the photoelectric conversion characteristic 702, luminance at Vtarget changes (increases) from Lt10 to Lt20 and the exposure amount decreases. Vtarget shown in FIG. 18B is set to describe a change of the exposure amount and may differ from Vtarget shown in FIG. 18A.

Although the photoelectric conversion characteristic is shifted in the arrow direction 705 in order to obtain Vmax in relation to the dynamic range setting luminance (Lm20) in FIG. 18B, it may be shifted in a direction (upward direction) opposite from the arrow direction 705. The photoelectric conversion characteristic is not changed (shifted) if Vmax can be obtained in relation to the dynamic range setting luminance as described above with the photoelectric conversion characteristic at the time of obtaining the AE evaluation values. However, in such a case, even if the exposure period set value and the aperture set value take the same values as those when the AE evaluation values were obtained last time, the exposure period set value and the aperture set value may be calculated this time.

By the AE control comprised of the exposure amount control in (A) and the dynamic range control in (B), photographing can be performed such that the exposure amount setting luminance is located in the linear characteristic area of the photoelectric conversion characteristic, the sensor output is of the specified level, and the sensor output at the dynamic range setting luminance (here, maximum luminance of the subject; maximum luminance in the dynamic range) is equal to or below the saturated sensor output level.

(Detailed Description of the Method for Calculating the Exposure Amount Control Parameter)

Here, the calculation of the exposure amount control parameters (exposure period set value and aperture set value) by the exposure amount control parameter calculating section 511 based on the AE evaluation values detected by the evaluation value detector 405 in the case of the exposure amount control of FIG. 18A is more specifically described.

FIG. 19 is a graph showing such an exemplary calculating method that a value of the sensor output at luminance Lt1 (exposure amount setting luminance) in FIG. 18A takes Vtarget. A photoelectric conversion characteristic $\alpha 1$ in FIG. 19 is a photoelectric conversion characteristic at the time of obtaining the AE evaluation values and is divided into a linear characteristic area 612 and a logarithmic characteristic area 613 with an inflection point 611 (corresponding sensor output is Vth) as a boundary. A photoelectric conversion characteristic $\beta 1$ is a photoelectric conversion characteristic obtained by converting the logarithmic characteristic area 613 of the photoelectric conversion characteristic $\alpha 1$ into a linear characteristic (linear characteristic area 614), i.e., a photoelectric conversion characteristic whose characteristic area is entirely the linear characteristic area.

LtLin at point A shown in FIG. 19 is an average luminance (linear characteristic area average luminance) in the linear characteristic area 612 of the photoelectric conversion characteristic $\alpha 1$, and a sensor output corresponding to this luminance LtLin is VtLin. LtLog at point B is an average luminance (logarithmic characteristic area average luminance) in the logarithmic characteristic area 613 of the photoelectric conversion characteristic $\alpha 1$ and a sensor output corresponding to this luminance LtLog is VtLog. Data conversion is performed such that point B corresponding to LtLog in the logarithmic characteristic area 613 of the photoelectric conversion characteristic $\alpha 1$ is shifted to point C in the linear characteristic area 614, i.e., a value (VtLog) of the sensor output corresponding to LtLog in the logarithmic characteristic area 613 takes a value (VtLogLin) in the linear characteristic area 614 (whereby the respective data in the photoelectric conversion characteristic $\alpha 1$ can be handled while being standardized into data in the linear characteristic area). The data conversion from the logarithmic characteristic area 613 (photoelectric conversion characteristic $\alpha 1$) to the linear characteristic area 614 (photoelectric conversion characteristic $\beta 1$) is performed using the LUT saved in the LUT storage 518. A sensor output VtAve at point D is calculated from VtLin at point A and VtLogLin at point C by the following equation. Luminance LtAve corresponding to VtAve corresponds to Lt1 as the exposure amount setting luminance shown in FIG. 18A.

$$VtAve = (VtLin*k1) + (VtLogLin*(1-k1))$$

where k1=m/(m+n), m: total number of pixels used upon calculating luminance LtLin at point A, n: total number of pixels used upon calculating luminance LtLog at point B.

In this way, values VtLin and VtLogLin are calculated from values LtLin and LtLog, and VtAve is calculated from the values VtLin and VtLogLin.

Next, such an amplification factor Gain of the exposure amount that VtAve becomes Vtarget shown in FIG. 18A, an amplification factor Gt of the exposure period and an amplification factor Gs of the aperture value based on the amplification factor Gain of the exposure amount, and an exposure period T2 and an aperture area S2 of the diaphragm 22 based on the amplification factors Gt, Gs are calculated by the following equations. The calculation of the values Gt, Gs using the respective equations is determined by the case division by a flowchart shown in FIG. 20.

$$Gain = Vtarget/VtAve$$

$$Gt*Gs = Gain$$

<Equations for Calculating the Amplification Factor of the Exposure Period>

$T\max/T1 = Gt\max$ (maximum amplification factor of the exposure period)

$T\min/T1 = Gt\min$ (minimum amplification factor of the exposure period)

$Gain/Gt\max = GGt\max$ (amplification factor for compensating for insufficiency at the maximum amplification factor)

$Gain/Gt\min = GGt\min$ (amplification factor for compensating for insufficiency at the minimum amplification factor)

$T2 = T1 * Gt$ where T1: exposure period at the time of detecting the AE evaluation values
T2: exposure period after the AE correction
Tmax: maximum exposure period of the image sensor 30
Tmin: minimum exposure period of the image sensor 30

<Equations for Calculating the Amplification Factor of the Aperture Value>

$S\max/S1 = Gs\max$ (maximum amplification factor of the aperture value)

$S\min/S1 = Gs\min$ (minimum amplification factor of the aperture value)

$Gain/Gs\max = GGs\max$ (amplification factor for compensating for insufficiency at the maximum amplification factor)

$Gain/Gs\min = GGs\min$ (amplification factor for compensating for insufficiency at the minimum amplification factor)

where S1: aperture area of the diaphragm at the time of detecting the AE evaluation values
S2: aperture area of the diaphragm after the AE correction
Smax: maximum aperture ratio of the diaphragm 22
Smin: minimum aperture ratio of the diaphragm 22

Figure 20:
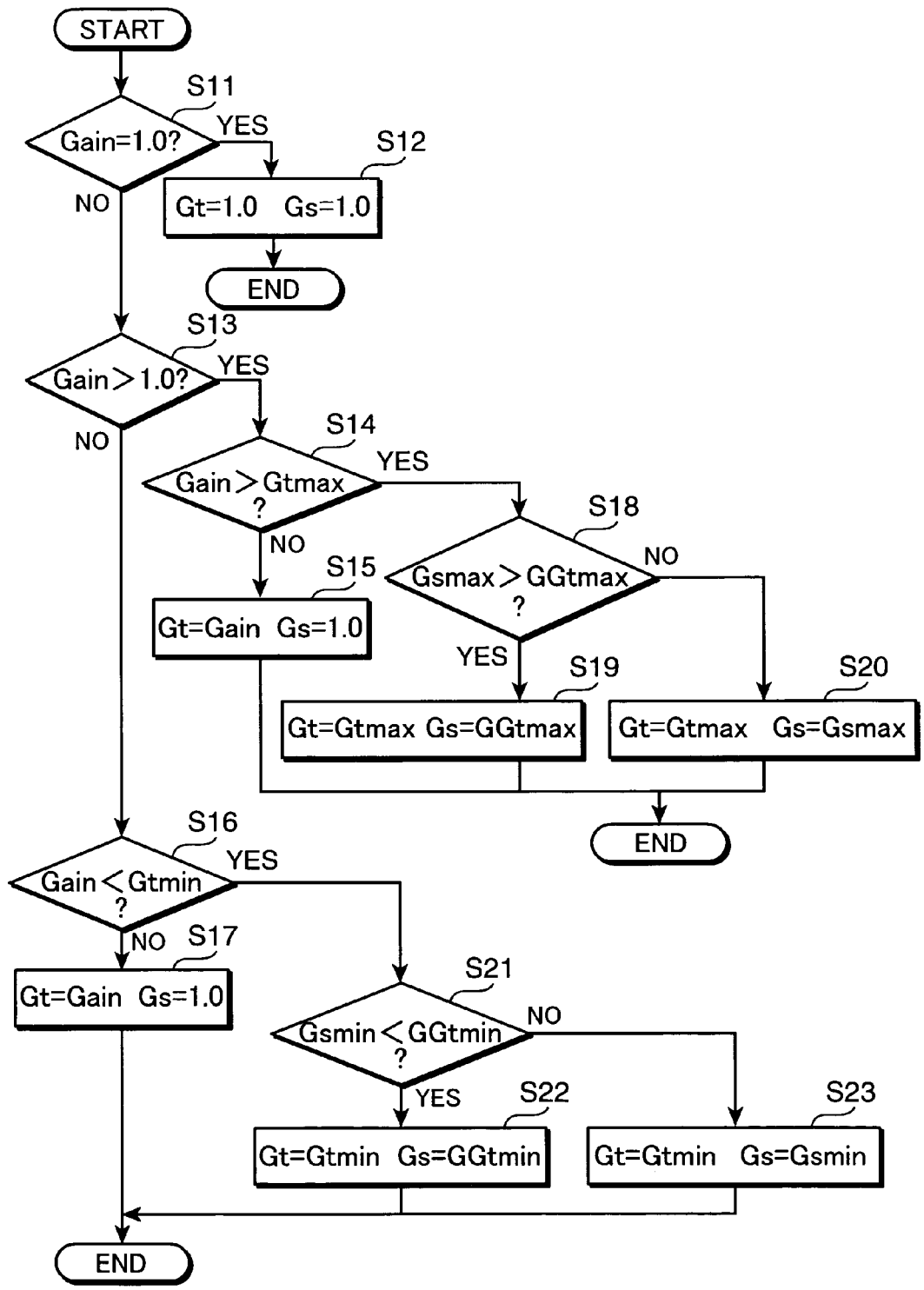
FIG. 20 is a flowchart showing an exemplary flow of calculating the exposure amount control parameter.

As shown in the flowchart of FIG. 20, if VtAve=Vtarget, i.e., the amplification factor Gain of the exposure amount=1.0 and it is not necessary to execute the exposure amount control (to change the exposure amount control parameter) (YES in Step S11), the amplification factor Gt of the exposure period and the amplification factor Gs of the aperture value are both set at 1.0 (Step S12), and neither the exposure period nor the aperture area of the diaphragm 22 is changed. If Gain ≠1.0 (NO in Step S11), Gain>1.0 (YES in Step S13) and Gain≦Gtmax (NO in Step S14), i.e., if Gain>1.0, the exposure amount control is necessary and the amplification factor Gain of the exposure amount can be dealt with by the amplification factor Gt of the exposure period (amplification factor Gt equal to or below the maximum amplification factor Gtmax), Gt=Gain and Gs=1.0 (Step S15).

If Gain≦1.0 in Step S13 (NO in Step S13) and Gain≧Gtmin (NO in Step S16), the exposure amount control is necessary since Gain≦1.0 similar to the case of Step S15, and the amplification factor Gain of the exposure amount can be dealt with by the amplification factor Gt of the exposure period (amplification factor Gt equal to or above the minimum amplification factor Gtmin). Thus, Gt=Gain and Gs=1.0 (Step S17).

If Gain>Gtmax in step S14 (Yes in Step S14) and Gsmax>GGtmax (YES in Step S18), Gt=Gtmax and Gs=GGtmax (Step S19). In Step S19, the amplification factor Gain of the exposure amount takes a value larger than the maximum amplification factor Gtmax of the exposure period, and cannot be dealt with only by the amplification factor Gt of the exposure period without changing the amplification factor Gs of the aperture value (Gs=1.0). Thus, an insufficiency of Gt with respect to Gain is dealt with (compensated) by changing the amplification factor Gs of the aperture value. The value of the amplification factor Gs of the aperture value is changed to the amplification factor GGtmax for compensating for insufficiency at the maximum amplification factor Gtmax of the exposure period. Since the amplification factor GGtmax takes a value smaller than the maximum amplification factor Gsmax of the aperture value (without needing the use of the amplification factor Gsmax of the aperture value), the amplification factor GGtmax concerning the exposure period is used. Thus, time to calculate a value (amplification factor) for controlling the diaphragm 22 using the amplification factor concerning the diaphragm can be saved.

If Gain>Gtmin in Step S16 (YES in Step S16) and Gsmin<GGtmin (YES in Step S21), Gt=Gtmin and Gs=GGtmin (Step S22). In this case, similar to Step S19, the amplification factor Gain of the exposure amount takes a value smaller than the minimum amplification factor Gtmin of the exposure period and cannot be dealt with only by the amplification factor Gt of the exposure period without changing the amplification factor Gs of the aperture value (Gs=1.0). Thus, insufficiency of Gt with respect to Gain is dealt with by changing the amplification factor Gs of the aperture value. The value of the amplification factor Gs of the aperture value is changed to the amplification factor GGtmin for compensating for insufficiency at the minimum amplification factor Gtmin of the exposure period. Since the amplification factor GGtmin takes a value smaller than the minimum amplification factor Gsmin of the aperture value (without needing the use of the amplification factor Gsmin of the aperture value), the amplification factor GGtmin concerning the exposure period is used. In this case as well, time to calculate a value (amplification factor) for controlling the diaphragm using the amplification factor concerning the diaphragm can be saved.

If Gsmax>GGtmax in Step S18 (NO in Step S18), Gt=Gtmax and Gs=Gsmax (Step S20). If Gsmin<GGtmin in Step S21 (NO in Step S21), Gt=Gtmin and Gs=Gsmin (Step S23). In Step S20, if the amplification factor GGtmax takes a value equal to or above the maximum amplification factor Gsmax of the aperture value, the maximum amplification factor Gsmax is used as a value of the amplification factor Gs of the aperture value. Likewise, in Step S23, if the amplification factor GGtmin takes a value equal to or below the maximum amplification factor Gsmin of the aperture value, the minimum Gsmin is used as the value of the amplification factor Gs of the aperture value.

In this embodiment, as shown in the flowchart of FIG. 20, the amplification factor Gt of the exposure period is prioritized (exposure period control is prioritized) upon selecting the control parameter for obtaining the amplification factor Gain of the exposure amount. However, the amplification factor Gs of the aperture value may be prioritized (aperture value control may be prioritized). Further, although the amplification factors Gt and Gs are calculated for one exposure amount setting luminance (Lt1) in this embodiment, a similar calculation may be made for two or more exposure amount setting luminances. In such a case, an average value or a maximum value or a minimum value of the calculated amplification factors (Gt, Gs) may be used for the respective luminances.

In this way, the amplification factors Gt, Gs are calculated, and the exposure period T2 after the AE correction and the aperture area S2 of the diaphragm 22 after the AE correction are calculated based thereon. Then, the set value for the image sensor 30 and the shutter 23 (exposure period set value) or the set value for the diaphragm 22 (aperture set value) corresponding to these values T2 and S2 are calculated by the data conversion using the corresponding LUTs. The exposure period set value and the aperture set value obtained by the data conversion are saved in the photoelectric conversion characteristic information storage 516 (or the exposure period set value and the aperture set value obtained when the AE evaluation values were obtained last time may be renewed by the newly obtained set values. This applies also to the photoelectric conversion characteristic set value described below).

It should be noted that, based on the exposure period set value and the aperture set value calculated in the exposure amount control parameter calculating section 511, the shutter control signal generator 523 and the diaphragm control signal generator 525 generate such control signals to be sent to the shutter driving section 61 and the diaphragm driving section 63 that the exposure period (integration period) by the image sensor 30 and the shutter 23 becomes T2 or the aperture area of the diaphragm 22 becomes S2.

Here, specific methods for calculating the sensor output level VtLin corresponding to the linear characteristic area average luminance LtLin and the sensor output level VtLog corresponding to the logarithmic characteristic area average luminance LtLog shown in FIG. 19 are described. First, the method for calculating the sensor output level VtLin corresponding to the average luminance LtLin is described. An average luminance in the linear characteristic area for each detection block (each of A to AJ blocks) in the main subject area shown in FIG. 15 (hereinafter, "block linear average luminance") is calculated based on the luminance information of the subject detected by each detection block in the main subject area 331 shown in FIG. 15. This block linear average luminance is calculated using average values of the linear characteristic area of the three colors R, G and B (hereinafter, "color linear average values). Specifically, color linear average values of R obtained from the A to AJ blocks are calculated as AveRA, AveRB, . . . , AveRAJ. Likewise, color linear average values of G and those of B are calculated as AveGA, AveGB, . . . , AveGAJ and AveBA, AveBB, . . . , AveBAJ, respectively. The block linear average luminance for each of the A to AJ blocks is calculated by an equation for the following color space conversion using the color linear average values of the respective colors R, G and B. For example, if AveYA denotes the block linear average luminance corresponding to the A block, AveYA can be obtained by the following equation.

$$AveYA = AveRA*K1 + AveGA*K2 + AveBA*K3$$

where K1, K2, K3 are coefficients used for the color space conversion from RGB to YCbCr and, for example, K1=0.2989, K2=0.5866 and K3=0.1145.

Similar calculations are made for the other B to AJ blocks, thereby calculating the block linear average luminances AveYA, AveYB, . . . , AveYAJ for the respective A to AJ blocks. Further, an average of these block linear average luminances AveYA, AveYB, . . . , AveYAJ is calculated. If MainY denotes this average value, MainY is the sensor output level VtLin corresponding to the linear characteristic area average luminance LtLin.

The sensor output level VtLog corresponding to the logarithmic characteristic area average luminance LtLog is calculated similar to the linear characteristic area average luminance LtLin. Specifically, an average luminance in the logarithmic characteristic area of each detection block (hereinafter, "block logarithmic average luminance") is calculated based on the luminance information of the subject detected by the A to AJ blocks in the main subject area 331 shown in FIG. 15. This block logarithmic average luminance is calculated using average values of the logarithmic characteristic area of the three colors R, G and B (hereinafter, "color logarithmic average value"). The color logarithmic average values of R obtained from the A to AJ blocks are calculated as AveRLogA, AveRLogB, . . . , AveRLogAJ. Likewise, the color logarithmic average values of G and B are calculated as AveGLogA, AveGLogB, . . . , AveGLogAJ and as AveBLogA, AveBLogB, . . . , AveBLogAJ, respectively.

The color logarithmic average values of the respective colors R, G, and B in the logarithmic characteristic area are temporarily converted into linear data taking values in the linear characteristic area using the LUT saved in the LUT storage 518, and the block logarithmic average luminances AveYLogA, AveYLogB, . . . , AveYLogAJ of the A to AJ blocks are similarly calculated in accordance with the color space converting equations using the values converted into the linear data. Further, an average value of the block logarithmic average luminances AveYLogA, AveYLogB, . . . , AveYLogAJ is calculated. If MainYLog denotes this average value, MainYLog is the sensor output level VtLogLin corresponding to the logarithmic characteristic area average luminance LtLog. The color linear average values (color logarithmic average values) of the respective colors in the A to AJ blocks may be calculated by calculating luminance histograms in the linear characteristic areas (logarithmic characteristic areas) of the respective A to AJ blocks, applying Gaussian pruning to the luminance histograms and averaging the respective luminance values after Gaussian pruning.

The specific method for calculating the amplification factor Gain (exposure amount control parameter) described with reference to FIGS. 19 and 20 may be as follows. First, a maximum value of the luminances of each color R, G, B in each of the A to AJ blocks of the main subject area 331 (hereinafter, "color maximum value") is calculated. Specifically, maximum values of R are calculated as MaxRA, MaxRB, . . . , MaxRAJ. Likewise, maximum values of G and those of B are calculated as MaxGA, MaxGB, . . . , MaxGAJ and as MaxBA, MaxBB, . . . , MaxBAJ, respectively. Block maximum luminances of the respective A to AJ blocks are calculated by an equation for the following color space conversion, using the maximum values of the luminances of the respective colors. For example, if MaxYA denotes the block maximum luminance corresponding to the A block, it can be calculated by the following equation.

$$MaxYA = MaxRA*K1 + MaxGA*K2 + MaxBA*K3$$

where K1, K2, K3 are respectively 0.2989, 0.5866, 0.1145 similar to the above. Similar calculations are made for the other B to AJ blocks, thereby calculating the block maximum luminances MaxYA, MaxYB, . . . , MaxYAJ of the respective A to AJ blocks. Further, a maximum value (maximum luminance value in the main subject area 331) of these block maximum luminances MaxYA, MaxYB, . . . , MaxYAJ is calculated. If MaxY denotes this maximum luminance value, MaxY is a sensor output level VtAve2 corresponding to luminance Ltmax shown in FIG. 21.

Similarly, minimum values of the luminances of the respective colors R, G and B in the respective A to AJ blocks (color minimum values) are calculated as MinRA, MinRB, ..., MinRAJ, as MinGA, MinGB, ..., MinGAJ and as MinBA, MinBB, ..., MinBAJ. Block minimum luminances MinYA, MinYB, ..., MinYAJ of the respective A to AJ blocks are calculated by a similar equation for the color space conversion, using these minimum values. Further, a minimum value (minimum luminance value in the main subject area 331) of these block minimum luminances MinYA, MinYB, ..., MinYAJ is calculated. If MinY denotes this minimum luminance value, MinY is a sensor output level VtAve1 corresponding to luminance Ltmin shown in FIG. 21.

It should be noted that the color space conversion is performed after the color maximum values and color minimum values located in the logarithmic characteristic area are similarly converted into values in the linear characteristic area using the LUT. The color maximum values and the color minimum values of the respective colors in the A to AJ blocks may be calculated as follows. Luminance histograms for the respective A to AJ blocks are first calculated and then Gaussian pruning is applied thereto. The color maximum and minimum values are calculated from the respective luminance values after Gaussian pruning.

Figure 21:
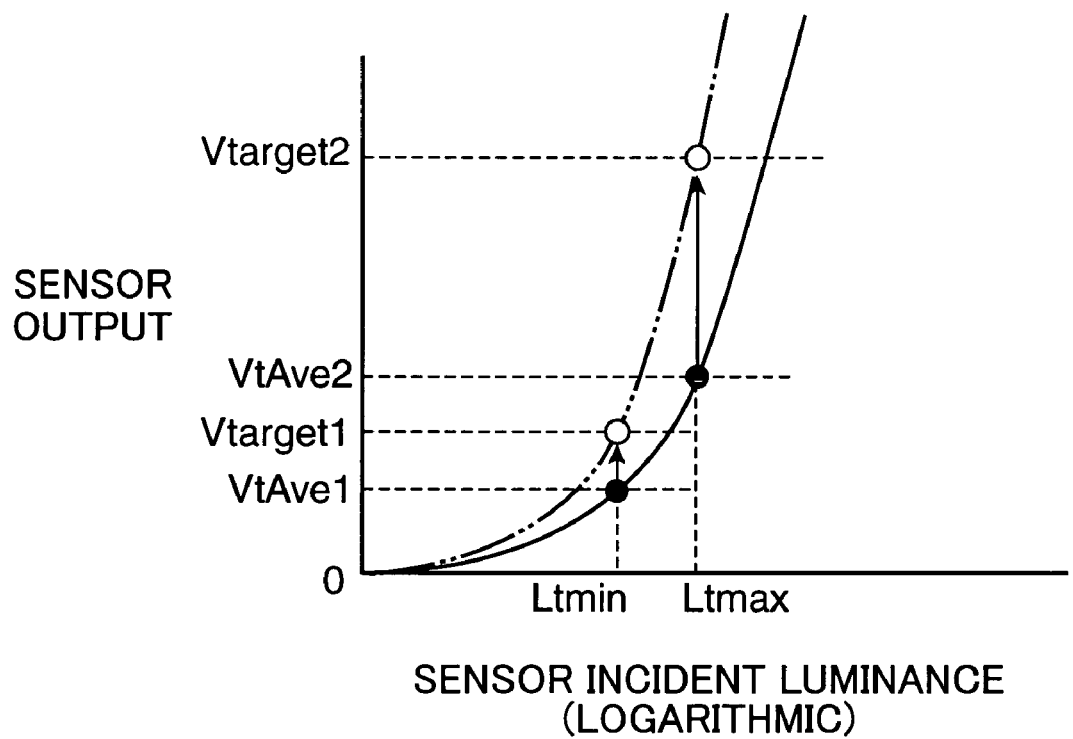
FIG. 21 is a graph showing a process upon calculating the exposure amount control parameter.

Then, as shown in FIG. 21, there are calculated such an amplification factor (Vtarget1/VtAve1: first amplification factor) that the sensor output value VtAve1 corresponding to luminance Ltmin becomes Vtarget1 which is a preset target output value, and such an amplification factor (Vtarget2/VtAve2: second amplification factor) that the sensor output value VtAve2 corresponding to luminance Ltmax becomes Vtarget2 which is a preset target output value. A smaller one of these two amplification factors is chosen, and the case division as shown in FIG. 20 is carried out using the selected amplification factor as the amplification factor Gain of the exposure amount, thereby calculating the amplification factor Gt of the exposure period and the amplification factor Gs of the aperture value.

A larger one of the first and second amplification factors may be selected or only the first or second amplification factor may be calculated and used instead of choosing one of the first and second amplification factors after comparison. Alternatively, an average of the first and second amplification factors may be used. The above values Vtarget1 and Vtarget2 are saved in the exposure amount control parameter calculating section 511 or the like.

The minimum and maximum luminance values MinY, MaxY may be calculated from a whole luminance histogram of the entire A to AJ blocks which is a sum of the luminance histograms of the A to AJ blocks. In this case, a luminance range of the whole luminance histogram is calculated by similarly applying Gaussian pruning, and the minimum and maximum luminance values MinY and MaxY are calculated from this luminance range. At the time of calculation, one of the minimum and maximum luminance values may be calculated from the other value and the luminance range. For example, minimum luminance value MinY=maximum luminance value MaxY−luminance range or maximum luminance value MaxY=minimum luminance value MinY+luminance range.

(Detailed Description of the Method for Calculating the Dynamic Range Control Parameter)

Next, the calculation of the dynamic range control parameter (photoelectric conversion characteristic set value) by the dynamic range control parameter calculating section 512 based on the AE evaluation values detected by the evaluation value detector 405 in the case of the exposure amount control of FIG. 18B is specifically described.

Figure 22A:
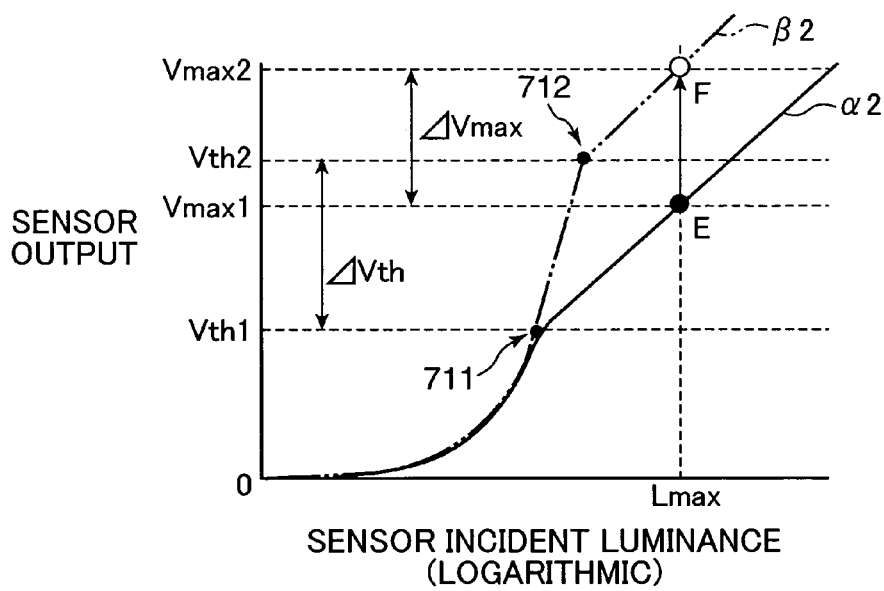
Figure 22B:
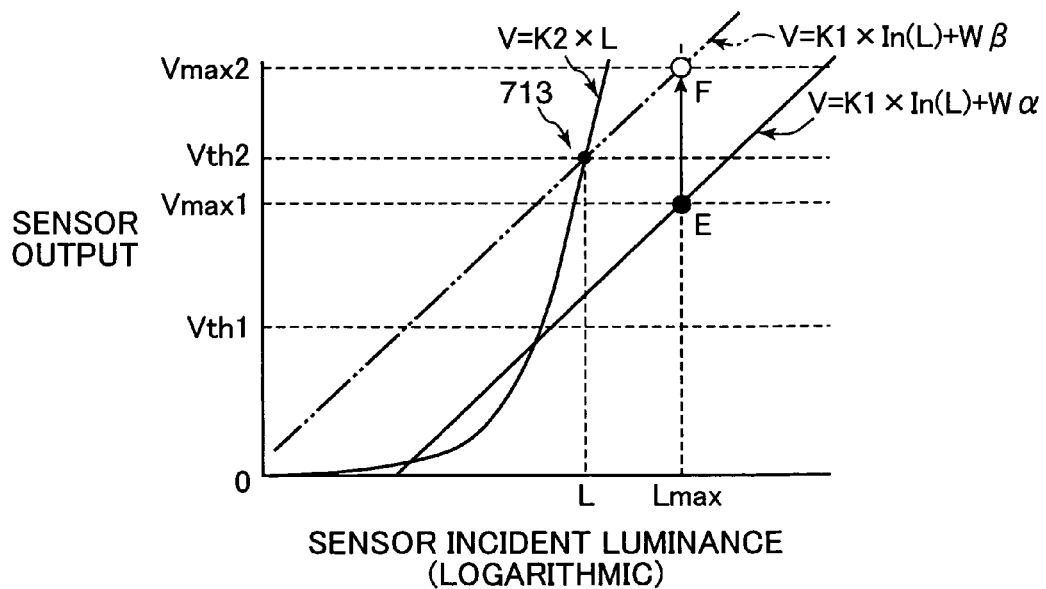

FIGS. 22A and 22B are graphs showing a method for calculating the position of an inflection point of a photoelectric conversion characteristic upon calculating the dynamic range control parameter, wherein FIG. 22A shows a case where the photoelectric conversion characteristic is so changed to have a specified sensor output in relation to luminance Lmax and FIG. 22B shows a case where the photoelectric conversion characteristic is modeled. First, in FIG. 22A, luminance Lmax is a dynamic range setting luminance and corresponds, for example, to Lm20 shown in FIG. 18B. A photoelectric conversion characteristic a2 is a photoelectric conversion characteristic before the change having an inflection point 711, whereas a photoelectric conversion characteristic β2 is a photoelectric conversion characteristic after the change having an inflection point 712. Vmax2 denotes a saturated output level (maximum output level) of the image sensor 30. The photoelectric conversion characteristic is changed such that a value of the sensor output corresponding to luminance Lmax shifts from Vmax1 at point E on the photoelectric conversion characteristic a2 to Vmax2 at point F on the photoelectric conversion characteristic β2. In this case, the photoelectric conversion characteristic a2 changes to a state of the photoelectric conversion characteristic β2 in accordance with a changed amount ΔVth between a sensor output Vth1 at the inflection point 711 and a sensor output Vth2 at the inflection point 712.

Vth2 is calculated from a sensor output ΔVmax (=Vmax2−Vmax1) between the points E and F. This is described below. As shown in FIG. 22B, if the linear characteristic areas and logarithmic characteristic areas of the photoelectric conversion characteristics a2, β2 are respectively modeled (represented by graphs), they can be expressed by functions (mathematical equations) as follows.

Function modeling the linear characteristic area:

$V = K2*L$ (common for the photoelectric conversion characteristics $a2, \beta2$)

Function modeling the logarithmic characteristic area:

$V = K1*ln(L) + Wa$ (photoelectric conversion characteristic $a2$)

$V = K1*ln(L) + W\beta$ (photoelectric conversion characteristic $\beta2$)

where K1, K2 denote constants; L an sensor incident luminance (coordinate on horizontal axis in FIG. 22); and Wa and Wβ intercepts.

Here, since ΔVmax is expressed by ΔVmax=Wβ−Wa, the above equation V=K1*ln(L)+Wβ is expressed by V=K1*ln(L)+(Wa+ΔVmax). Vth2 is a sensor output value at an intersection 713 of this equation and the equation K2*L. Accordingly, the sensor output Vth2 corresponding to luminance L can be calculated by calculating the value of "L" satisfying the simultaneous equations of these two equations, K1*ln(L)+(Wa+ΔVmax)=K2*L for calculating the intersection 713 (coordinates), i.e., by calculating the luminance L shown in FIG. 22B. If the calculated output level Vth2 is larger than the saturated output level Vmax2, the image sensor 30 possesses such a photoelectric conversion characteristic having only the linear characteristic area without having the logarithmic characteristic area.

Then, a set value for the image sensor 30 corresponding to the thus calculated Vth2, i.e., a set value (photoelectric conversion characteristic set value) for changing the photoelectric conversion characteristic such that the inflection point of the photoelectric conversion characteristic comes to be located at the position of Vth2 is calculated by the data conversion of the inflection point Vth2 using the LUT. The photoelectric conversion characteristic set value corresponding to the inflection point Vth2 obtained by the data conversion is saved in the photoelectric conversion characteristic information storage 516. Based on the photoelectric conversion characteristic set value calculated in the dynamic range control parameter calculating section 512, the dynamic range control signal generator 521 generates such a control signal to be sent to the timing generating circuit 31 that the photoelectric conversion characteristic (position of the inflection point) of the image sensor 30 changes as above.

A specific method for calculating the sensor output level Vmax1 corresponding to the luminance Lmax as a dynamic range setting luminance shown in FIG. 22 is as follows. First, similar to the calculation of the sensor output level VtLog corresponding to the logarithmic characteristic area average luminance LtLog in FIG. 19, the logarithmic characteristic area average luminance in the main subject area 331 (A to AJ blocks) shown in FIG. 15 is calculated, and a logarithmic characteristic area average luminance in the peripheral subject area 332 (first to sixteenth blocks) is calculated as in the case of the main subject area 331. A larger one of the logarithmic characteristic area average luminances calculated in the main subject area 331 and in the peripheral subject area 332 is chosen by a comparison, and a sensor output level corresponding to the chosen logarithmic characteristic area average luminance is set as Vmax1.

Not only the sensor outputs corresponding to the logarithmic characteristic area average luminances in the main and peripheral subject areas 331, 332, but also the one corresponding to the linear characteristic area average luminance similar to the linear characteristic area average luminance LtLin in FIG. 19 may be calculated; a whole characteristic area average luminance averaging the linear characteristic area average luminance and the logarithmic characteristic area average luminance may be calculated for each of the main subject area 331 and the peripheral subject area 332; and a larger one of the whole characteristic area average luminances of the respective areas may be set as the sensor output. If the whole characteristic area average luminances are equal to each other, either luminance value may be set as the sensor output corresponding to the luminance Lmax (and so forth).

Alternatively, the sensor output corresponding to the luminance Lmax may be obtained from the logarithmic characteristic area average luminance (or whole characteristic area average luminance as a sum of the logarithmic characteristic area average luminance and the linear characteristic area average luminance) only in the main subject area 331, or the sensor output corresponding to the luminance Lmax may be obtained from the logarithmic characteristic area average luminance (or whole characteristic area average luminance as a sum of the logarithmic characteristic area average luminance and the linear characteristic area average luminance) only in the peripheral subject area 332.

The specific method for calculating the sensor output corresponding to the luminance Lmax may be as follows. First, similar to the calculation of the sensor output value corresponding to the maximum luminance value Ltmax (MaxY) in FIG. 21, the maximum luminance value in the main subject area 331 is calculated and the maximum luminance value in the peripheral subject area 332 is calculated similar to the case of the main subject area 331. A larger one of the maximum luminance values calculated in the main subject area 331 and the peripheral subject area 332 is chosen by a comparison; a sensor output level corresponding to the chosen maximum luminance value is calculated; and luminance corresponding to this output level is set as the luminance Lmax. The sensor output corresponding to the luminance Lmax may be obtained from the maximum luminance value only in the main subject area 331, or it may be obtained from the maximum luminance value only in the peripheral subject area 332.

Figure 23A:
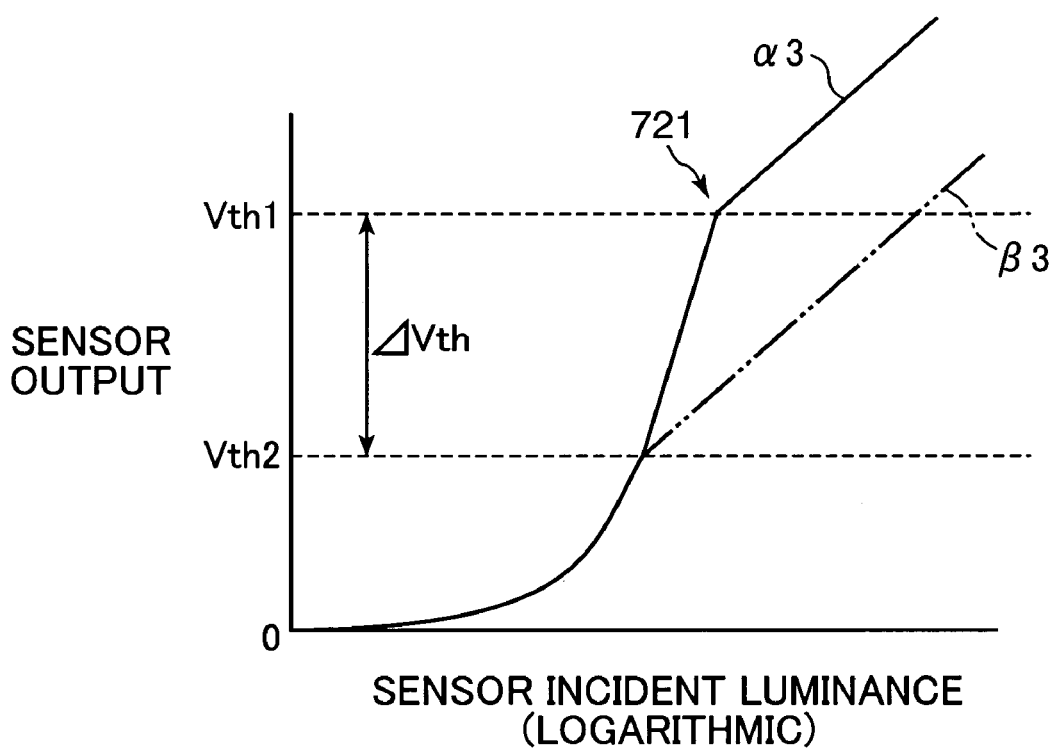
FIG. 23A and FIG. 23B are graphs showing a process upon calculating the dynamic range control parameter.
Figure 23B:
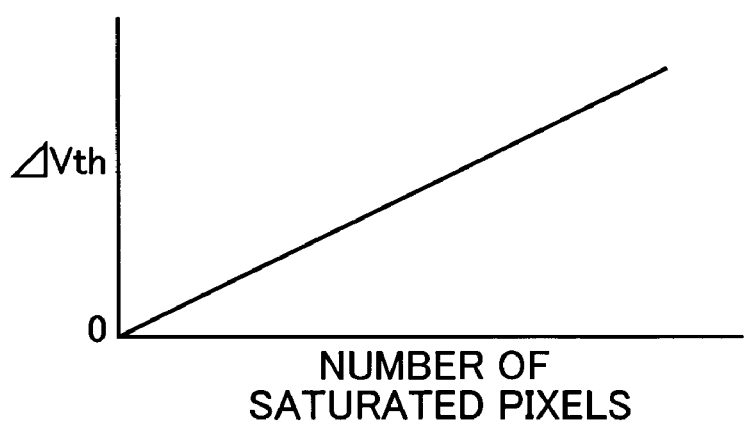
Figure 24:
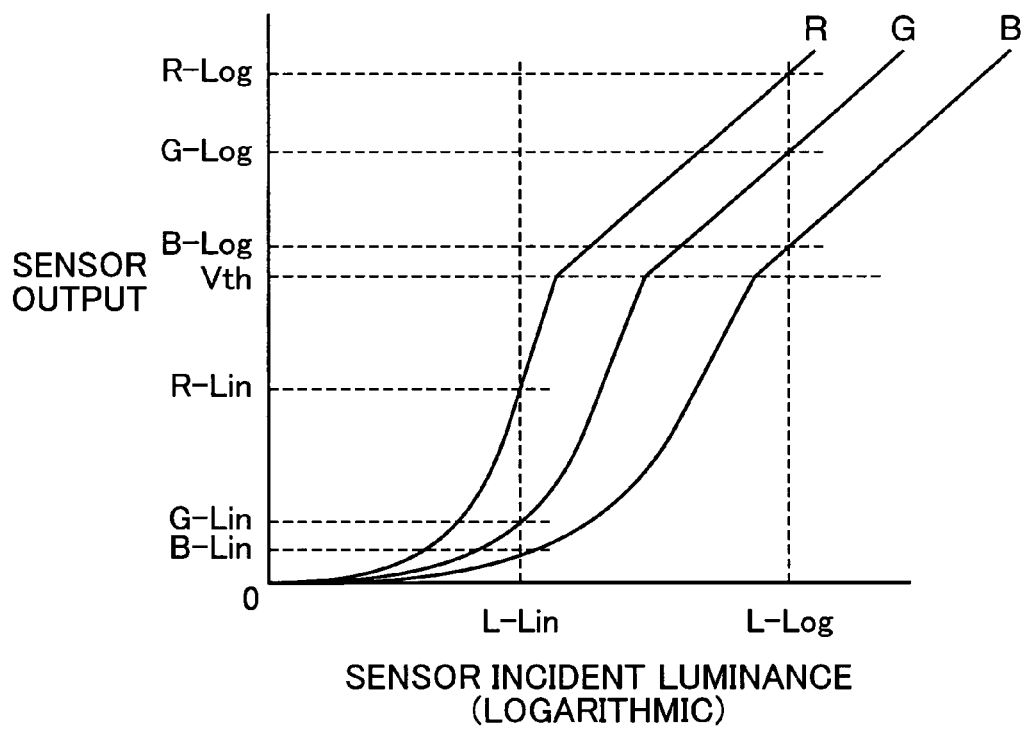
FIG. 24 is a graph showing a process of detecting a white balance evaluation value.

The control of the photoelectric conversion characteristic (position of the inflection point) based on the photoelectric conversion characteristic set value as shown in FIGS. 22A and 22B is actually carried out if the saturation discriminating section 4056 (see FIG. 14) discriminates that the output level of the image sensor 30 is not saturated as described with reference to FIG. 15. If the output level is discriminated to be saturated, the photoelectric conversion characteristic is changed in accordance with the number of saturated pixels such that the output level at the inflection point is reduced by $\Delta$Vth as shown in FIG. 23A, i.e., the dynamic range is widened to enable the photographing by the image sensor 30 at a high-luminance side. Here, the photoelectric conversion characteristic is changed from a photoelectric conversion characteristic a3 to a photoelectric conversion characteristic β3. The value of $\Delta$Vth is so set as to increase as the number of saturated pixels increases as shown in FIG. 23B, and $\Delta$Vth corresponding to the number of saturated pixels is calculated by the data conversion by means of an LUT. Then, an output level Vth2 at the inflection point 722 of the photoelectric conversion characteristic β3 after the change (characteristic having a wider dynamic range as compared to the photoelectric conversion characteristic a3) can be obtained by subtracting the calculated $\Delta$Vth from the output level Vth1 at the inflection point 721 of the photoelectric conversion characteristic a3 at the time of calculating the AE evaluation values. A set value (photoelectric conversion characteristic set value) for the image sensor 30 corresponding to the obtained Vth2 is calculated by the data conversion by means of the LUT. The photoelectric conversion characteristic set value corresponding to the output level Vth2 obtained by this data conversion is saved in the photoelectric conversion characteristic information storage 516.

(Step S3-1) Setting of the Exposure Amount Control Parameter:

When the exposure amount control parameter for the AE control is calculated by the method as described in Step S2-1, the AE control is carried out based on the exposure amount control parameter and the actual photographing is performed. Specifically, in the case of picking up a still image, the substantial photographing is performed after the AE control based on the AE evaluation values obtained from the preliminarily picked-up image. In the case of picking up moving images, moving images are successively photographed after the AE control based on the AE evaluation values obtained, for example, from an image picked up immediately before.

Specifically, the exposure amount control parameter calculated in the exposure amount control parameter calculating section 511 of the central control unit 50 is inputted to the control signal generator 520, whereby control signals for operating the timing generating circuit 31 and the driving unit 60 for generating drive signals to carry out an actual exposure amount control are generated in the respective sections of the control signal generator 520. The sensor exposure period control signal generator 522 generates a control signal for the image sensor 30 so that a predetermined exposure period can be ensured in accordance with the exposure amount control parameter, and sends it to the timing generating circuit 31. The control signal here is a signal for setting, for example, the period $\Delta$S, during which the signal f VPS to be sent to the image sensor 30 takes the medium potential M in the timing chart shown in FIG. 9, at a suitable period in accordance with the exposure amount control parameter (signal for setting the integration period between time t1 when the resetting of the parasitic capacitance of the photodiode PD ends and time t2 when the readout of the video signal of the next frame is started at a suitable period). The timing generating circuit 31 generates a timing signal for controlling the exposure period of the image sensor 30 in accordance with the inputted drive signal, thereby driving the image sensor 30.

Likewise, based on the exposure amount control parameter, the shutter control signal generator 523 generates a control signal for setting the shutter speed (shutter opening period) of the shutter 23 in conformity with the exposure period. This control signal is sent to the shutter driving section 61 of the driving unit 60, and the shutter driving section 61 generates a drive signal for the shutter 23 in accordance with the received control signal to cause the shutter 23 to open in accordance with the exposure amount control parameter.

The diaphragm control signal generator 525 likewise generates a control signal for setting the aperture area of the diaphragm 22 in accordance with the exposure amount control parameter. This control signal is sent to the diaphragm driving section 63, which generates a drive signal for the diaphragm 22 in accordance with the received control signal, whereby the aperture area of the diaphragm 22 corresponding to the exposure amount control parameter is set.

As described above, the exposure amount control (control of the integration period) can be carried out by the drive control of the image sensor 30 by the timing generating circuit 31, the shutter speed control and the aperture control. These three controls may be all carried out but, in view of attaining a high-speed control, it is desirable to prioritize the exposure amount control by the timing generating circuit 31 using the electronic circuitry as described with reference to the flowchart of FIG. 21.

(Step S3-2) Setting of the Dynamic Range Control Parameter

On the other hand, in the case of carrying out the AE control according to this embodiment by the dynamic range control, the dynamic range control parameter calculated in the dynamic range control parameter calculating section 512 of the central control unit 50 is inputted to the control signal generator 520, and a control signal for causing the execution of an actual dynamic range control is generated in the dynamic range control signal generator 521.

In accordance with the photoelectric conversion characteristic set value for the image sensor 30 calculated in the dynamic range control parameter calculating section 512, the dynamic range control signal generator 521 generates a control signal to be sent to the image sensor 30 for adjusting the output level point (inflection point) where the photoelectric conversion characteristic is switched from the linear characteristic area to the logarithmic characteristic area, and sends it to the timing generating circuit 31. The control signal here is, for example, the control signal for suitably setting the signal fVPS to be sent to the image sensor 30 in accordance with the calculated dynamic range control parameter in the timing chart of FIG. 9.

Specifically, since the inflection point is changed by controlling the intensity of the voltage VPH in the signal fVPS or the duration of the period ΔT, the dynamic range control signal generator 521 generates a control signal for controlling the signal fVPS in accordance with the dynamic range control parameter and sends it to the timing generating circuit 31. The timing generating circuit 31 then generates a timing signal for controlling the dynamic range of the image sensor 30 in accordance with the received control signal, thereby actually driving the image sensor 30 in a state of a specified photoelectric conversion characteristic.

Based on the AE evaluation values obtained from the luminance information of the subject, the exposure period is controlled by controlling the shutter speed of the shutter 23 (shutter opening period) or the integration period of the image sensor 30 and the aperture value is controlled by controlling the aperture area of the diaphragm 22, thereby executing the exposure amount control (AE control) or the dynamic range is controlled by controlling (the inflection point of) the photoelectric conversion characteristic (AE control) in the exposure amount control (AE control) based on the AE evaluation values in the setting of the exposure amount control parameter (Step S3-1) or in the dynamic range control (AE control) based on the AE evaluation values in the setting of the dynamic range control parameter. Depending on which one of the respective characteristic areas (linear characteristic area and logarithmic characteristic area) the AE evaluation values were obtained from, a control amount in this AE control is suitably controlled. Specifically, in the case of, for example, evaluation by the logarithmic characteristic, i.e., in the case of evaluation using the AE evaluation values obtained from the subject luminance information in the logarithmic characteristic area, a changed amount of the exposure amount (amount of the control signal (drive signal)), i.e., changed amounts of the shutter speed, the integration period of the image sensor 30 and the aperture area of the diaphragm 22 or a changed amount of the dynamic range, i.e., a shifted amount of the position of the inflection point (control signal (drive signal) amount) is increased.

Such a control is carried out for the following reason. Since the information carried by the AE evaluation values obtained from the logarithmic characteristic area is logarithmically compressed, a change of an image data corresponding to a change of the exposure amount or the dynamic range is accordingly compressed. It should be noted that the AE evaluation values obtained from the subject luminance information in the logarithmic characteristic area mean the AE evaluation values calculated from the luminance information from the logarithmic characteristic area having no data conversion or the like into the linear characteristic area applied thereto (logarithmically compressed information) or those that were temporarily converted into the luminance information in the linear characteristic area, but were reconverted into the AE evaluation values corresponding to the logarithmic characteristic area by a data conversion (conversion from the logarithmic characteristic to the linear characteristic) using a LUT or the like after the calculation using the converted luminance information. The one data corresponding to the logarithmic characteristic is temporarily converted into the corresponding to the linear characteristic and then reconverted again into the data corresponding to the logarithmic characteristic for the following reason. In order to simplify the processing during a specified calculation, it is desirable to temporarily standardize all the data into those corresponding to the linear characteristic. However, if all the data are handled as those corresponding to the linear characteristic, a data width (bus width, data amount) may become larger. Thus, depending on the control, this is suitably adjusted.

Although the above description was made while being centered on the AE control, the AF control, the WB control and the like are also carried out in the actual electronic camera 1. The AF control can be similarly carried out based on the AF evaluation value obtained from the image picked up by the image sensor 30. For example, the AF evaluation values can be calculated by a so-called "hill-climbing detecting method" of obtaining a point, where the contrast to the luminance at an adjacent point is at its maximum, in the evaluation value detector 405, using the luminance histograms detected from the blocks O, P, U and V of the main subject area 331 shown in FIG. 14. In such a case, it is desirable to detect the AF evaluation values from the linear characteristic area and the logarithmic characteristic area of the image sensor 30 and, for example, use the AF evaluation value obtained from the logarithmic characteristic area for rough distance measurement upon the AF control while using the one obtained from the linear characteristic area for detailed distance measurement.

The AF evaluation values detected in the evaluation value detector 405 in this way are sent to the AF control parameter calculating section 513 of the central control unit 50. The AF control parameter calculating section 513 calculates the AF control parameter corresponding to the AF evaluation values and sends it to the zooming/focusing control signal generator 523, in which a control signal corresponding to the received AF control parameter is generated and sent to the zooming/focusing section 62. The zooming/focusing section 62 generates a drive signal corresponding to the control signal, and the lens group 21 of the barrel 20 is driven to attain a focusing condition in accordance with this drive signal.

Zooming/focusing control is carried out by moving the position of the lens such as a zoom lens block based on the AF evaluation value obtained from the luminance information of the subject in this way. Depending on which of the respective characteristic areas (linear characteristic area and logarithmic characteristic area) the AF evaluation value is obtained from, a control amount in the zooming/focusing control is suitably adjusted. Specifically, in the case of, for example, evaluation using the logarithmic characteristic, i.e., in the case of carrying out a control using the AF evaluation value obtained from the luminance information of the subject in the logarithmic characteristic area, a moved amount of the lens (amount of the control signal (drive signal) concerning the lens displacement) is larger than in the case of evaluation using the linear characteristic. Such a control is carried out since the AF evaluation value obtained form the logarithmic characteristic area has its information logarithmically compressed and a change in contrast corresponding to the moved amount of the lens is accordingly compressed similar to the case of the aforementioned AE control evaluation values. Similar to the AE evaluation values, the AF evaluation value obtained from the subject luminance information in the logarithmic characteristic area means the AF evaluation value calculated from the luminance information kept logarithmically compressed without having no data conversion or the like into the linear characteristic area applied thereto or the one that was temporarily converted into the luminance information in the linear characteristic area, but was reconverted into data as the logarithmic characteristic by the data conversion by means of the LUT or the like after the calculation using this luminance information.

The WB control can be also carried out based on the WB evaluation values obtained from an image picked up by the image sensor 30. In this case as well, it is desirable to detect the WB evaluation values from the respective linear characteristic area and logarithmic characteristic area of the image sensor 30. Specifically, the WB evaluation values are assumed to be detected from neutral images based on the picked up image, and it is desirable to detect luminances L-Lin, L-Log for the evaluation value detection (for the setting of the WB control), i.e., sensor output levels of the respective colors R, G, B corresponding to the respective luminances L-Lin, L-Log (R-Lin, G-Lin, B-Lin, R-Log, G-Log, B-Log) and obtain the WB evaluation values based on the detected information based on two kinds of images in the linear characteristic area and logarithmic characteristic area as the neutral images. The evaluation value detector 405 detects such WB evaluation values and sends them to the WB controller 406, which conducts such a WB correction as to have a suitable color balance.

In this way, the WB evaluation values are detected while being distinguished into those from the linear characteristic area or those from logarithmic characteristic area (while those from the linear characteristic area and logarithmic characteristic area are separated from each other) and the WB control is carried out using the WB evaluation values distinguished based on the characteristic area. This can prevent an occurrence of a situation where the WB evaluation values are applied while leaving it unknown which of the linear characteristic area and the logarithmic characteristic area they are obtained from, e.g., the WB evaluation values obtained from the linear characteristic area are applied to an actually picked-up image although this image is mainly located in the logarithmic characteristic area, whereby a value to be actually corrected is deviated from a correct one and a precise WB control cannot be carried out (e.g., the image is corrected into the one that is not sufficiently whitened). Similar to the cases of the AE control and the AF control, a control amount (signal amount) in the WB control is suitably adjusted depending on whether the WB evaluation values are obtained from the linear characteristic area or the logarithmic characteristic area in the case of carrying out the WB control based on the WB evaluation values as well.

As described above, according to the inventive image sensing apparatus (electronic camera 1), the evaluation values concerning the image sensing control upon picking up a subject image are detected from the respective linear characteristic area and logarithmic characteristic area of the image sensor 30 by the evaluation value detector 405, and the image sensing control is carried out based on the evaluation values by the central control unit 50 (image sensing controller). Accordingly, the image sensing control of the image sensing apparatus can be carried out in conjunction with the photoelectric conversion characteristic (linear characteristic area and logarithmic characteristic area) of the image sensor 30 provided in the image sensing apparatus, and there is no likelihood that the evaluation value (evaluation data) obtained from one of the characteristic areas of the photoelectric conversion characteristic is used for the image data obtained from the other characteristic area without being distinguished which characteristic area the evaluation value is obtained from. Therefore, the evaluation values suitable for the respective characteristic areas can be securely used, which enables a more precise image sensing control to be carried out.

Further, the evaluation value detector 405 applies a specified data conversion to temporarily standardize pieces of the subject luminance information in the respective characteristic areas of the photoelectric conversion characteristic into the luminance information corresponding to the either one of the respective characteristic areas (e.g., luminance information corresponding to the logarithmic characteristic area is standardized so that all the luminance information corresponds to the linear characteristic area; see description with respect to FIG. 19), and the evaluation values are detected based on this standardized luminance information. Thus, the detection (calculation) of the evaluation values corresponding to the respective characteristic areas can be easily and securely performed without any error correspondence with the respective characteristics (error calculation), and it becomes possible to detect the evaluation values based on information newly obtained, for example, by adding the respective pieces of information standardized to have the same characteristic (information in the linear characteristic+information in the logarithmic characteristic), i.e., to increase an amount of information which serves as a basis of the evaluation value calculation by standardizing the characteristic. This can lead to an improvement in the precision of the evaluation values.

Furthermore, the evaluation value detector 405 converts the output level of the subject luminance corresponding to the characteristic of one of the respective areas into the one corresponding to the characteristic of the other area (e.g., data conversion from the logarithmic characteristic area 613 into the linear characteristic area 614 in FIG. 19) based on the conversion information saved in the LUT storage 518 (conversion information storage device), thereby performing the data conversion. Thus, the data conversion can be easily performed by a simple construction.

Further, since the central control unit 50 (image sensing controller) carries out the image sensing control using the control amounts in conformity with the evaluation values corresponding to the respective characteristic areas of the photoelectric conversion characteristic, a more precise image sensing control can be carried out.

Furthermore, the central control unit 50 (image sensing controller) carries out the image sensing control while treating the control amount in accordance with the evaluation values corresponding to the logarithmic characteristic area to be larger than the one in accordance with the evaluation values corresponding to the linear characteristic area. For example, the following image sensing controls can be carried out. In the control of the position (lens focusing position) of the lens such as a zoom lens block at the time of the AF control, a moved amount (control amount) of the lens can be increased to a larger extent in the case of evaluation using the logarithmic characteristic (in the case of evaluation using the evaluation values corresponding to the logarithmic characteristic area) than in the case of evaluation using the linear characteristic area. In the exposure amount control and the dynamic range control at the time of the AE control, changed amounts of the exposure amount and the dynamic range can be increased to a larger extent in the case of evaluation using the logarithmic characteristic than in the case of evaluation using the linear characteristic. Therefore, a more precise and faster image sensing control can be carried out in conformity with the various controls.

Further, the evaluation value detector 405 (divided light measuring section 4050) detects the luminance of the picked-up image by dividing the picked up image (image sensing area 330) of the subject into the main subject area 331 and the peripheral subject area 332, each being divided into a specified number of detection blocks, by using the so-called divided light measuring method, and detects various evaluation values based on the main subject luminance and the peripheral subject luminance corresponding to the main subject area 331 and the peripheral subject area 332. Thus, the area (main subject area or peripheral subject area) where the evaluation values (luminance information) is obtained can be selected such that optimal evaluation values (luminance information) are used in conformity with the respective controls (e.g., AE control, AF control and WB control) instead of constantly using the luminance information of the entire picked-up image upon carrying out the image sensing control; the evaluation values can be detected based on the luminance information in each detection block; and the evaluation values from the main subject area or the peripheral subject area can be easily and securely detected (calculated).

Furthermore, since the evaluation value detector 405 detects the respective evaluation values based on the luminance histograms (main subject luminance histogram and peripheral subject luminance histogram) calculated by the histogram calculating section 4052, desired evaluation values can be easily and securely detected from the subject luminances in the respective areas.

Further, since the evaluation value detector 405 detects any one of the AE evaluation values for the AE control, the AF evaluation values for the AF control and the WB evaluation values for the WB control, there can be obtained an image sensing apparatus capable of precisely carrying out the image sensing control such as the AE control, the AF control or the WB control using these evaluation values. It should be noted that the present invention may be embodies as follows.

(A) Although each pixel of the image sensor 30 includes the P-channel MOSFET in the foregoing embodiment, it may include an N-channel MOSFET.

(B) Although the subject luminance is detected by the image sensor 30 in the foregoing embodiment, a light meter (device for measuring the luminance of the subject in divided sections by means of a plurality light receiving elements) separate from the image sensor 30 may be used to detect the subject luminance (AE evaluation values). However, in view of the simplification of mechanism, it is desirable to detect the subject luminance (AE evaluation values) in accordance with an image signal obtained from an image actually picked up by the image sensor 30.

(C) Although the exposure period is controlled by the shutter 23 and the image sensor 30 in the foregoing embodiment, it may be controlled by either one of the shutter 23 and the image sensor 30.

(D) Although the set values for the image sensor 30, the shutter 23 and the diaphragm 22 obtained by the data conversion of the exposure period T2 and the aperture area S2 of the diaphragm 22 using the LUTs are used as the exposure period set value and the aperture set value in the foregoing embodiment, the amplification factors Gt, Gs (or the exposure period T2 and the aperture area S2 of the diaphragm) may be used as the exposure period set value and the aperture set value. Likewise, the output level Vth2 (or ΔVth) at the inflection point may be used as the photoelectric conversion characteristic set value.

(E) Although the primary color data of R, G and B are used as the image data for calculating the evaluation values in the foregoing embodiment, other image data such as complementary color image data or monochromatic luminance data may be used.

(F) The image sensing area 330 may not be divided according to the divided light measuring method. For example, it may be divided by either a spot light measuring method or a central light measuring method. Further, the main subject area 331 and the peripheral subject area 332 of the image sensing area 330 may not adopt the block configurations as shown in FIG. 15. Further, although the evaluation values are calculated for each block, the evaluation values may be calculated in the two areas (two blocks, each area is assumed as one block): main subject area 331 and peripheral subject area 332. Instead of dividing the image sensing area 330 into the two areas of the main subject area 331 and the peripheral subject area 332, the image sensing area 330 may be divided into three or more areas, the evaluation values may be calculated from luminance information in (blocks of) the respective areas, and the AE control may be carried out based on the calculated evaluation values. Alternatively, the evaluation values may be similarly calculated for one image sensing area without dividing the image sensing area and the AE control may be carried out using the calculated evaluation values. Further, the aforementioned areas (blocks) of the image sensing area 330 may be set on occasion in accordance with an operation instruction given from a user.

As described above, an image sensing apparatus is provided with an image sensor adapted to generate an electrical signal corresponding to an amount of an incident light and having a photoelectric conversion characteristic comprised of a linear characteristic area where the electrical signal is outputted after being linearly converted in relation to the amount of the incident light and a logarithmic characteristic area where the electrical signal is outputted after being logarithmically converted in relation to the amount of the incident light, an evaluation value detector which detects evaluation values concerning an image sensing control from each of the linear characteristic area and the logarithmic characteristic area upon picking up an image of a subject based on pieces of subject luminance information in the respective areas, and an image sensing controller which carries out the image sensing control based on the evaluation values corresponding to the respective areas detected by the evaluation value detector.

With this construction, the evaluation value detector detects the evaluation values concerning the image sensing control upon picking up the image of the subject from the linear characteristic area and the logarithmic characteristic area of the image sensor, and the image sensing controller carries out the image sensing control based on the evaluation values. Accordingly, the image sensing control of the image sensing apparatus can be carried out in conjunction with the photoelectric conversion characteristic (linear characteristic area and logarithmic characteristic area) of the image sensor provided in the image sensing apparatus, and the evaluation values suitable for the respective areas can be securely used without using the evaluation values (evaluation data) obtained from one of the characteristic areas of the photoelectric conversion characteristic for an image data obtained form the other characteristic area while which of the characteristic areas they were obtained from is left undistinguished. As a result, a more precise image sensing control can be carried out.

The "image sensing" mentioned in the embodiments means not only the storing of electric charges resulting from the exposure of the image sensor and the readout of the stored electric charges, but also a series of image sensing operations including image processings applied to the image obtained by this readout (e.g., white balance adjustment, color adjustment, contrast adjustment, compression).

The evaluation value detector may be preferably made to perform a specified data conversion to standardize the pieces of subject luminance information in the respective areas into the luminance information corresponding to either one of the respective areas, and detects the evaluation values based on the standardized luminance information.

With this construction, the evaluation value detector performs the specified data conversion to temporarily standardize the pieces of the subject luminance information in the respective areas into the luminance information corresponding to either one of the respective areas (e.g., luminance information corresponding to the logarithmic characteristic is entirely standardized into the one corresponding to the linear characteristic area), and detects the evaluation values based on this standardized luminance information. Thus, the detection (calculation) of the evaluation values corresponding to the respective characteristic areas can be easily and securely performed without any error correspondence with the respective characteristics (error calculation), and it becomes possible to detect the evaluation values based on information newly obtained, for example, by adding the respective pieces of information standardized to have the same characteristic (information in the linear characteristic+information in the logarithmic characteristic), i.e., to increase an amount of information which serves as a basis of the evaluation value calculation by standardizing the characteristic. This can lead to an improvement in the precision of the evaluation values.

The image sensing apparatus may be preferably further provided with a conversion information storage device which saves conversion information for the specified data conversion. In this case, the evaluation value detector converts an output level of the subject luminance corresponding to one of the respective areas into an output level corresponding to the other area based on the conversion information saved in the conversion information storage device.

With this construction, the evaluation value detector converts the output level of the subject luminance corresponding to the characteristic of one of the respective areas into the one corresponding to the characteristic of the other area based on the conversion information saved in the conversion information storage device, thereby performing the data conversion. Thus, the data conversion can be easily performed by a simple construction.

The image sensing controller may be preferably made to carry out the image sensing control using control amounts in conformity with the evaluation values corresponding to the respective areas detected by the evaluation value detector. With this construction, a more precise image sensing control can be carried out.

The image sensing controller may be preferably made to carry out the image sensing control while treating the control amounts in conformity with the evaluation values corresponding to the logarithmic characteristic area to be larger than those in conformity with the evaluation values corresponding to the linear characteristic area.

With this construction, the following image sensing controls can be, for example, carried out. In the control of the position (lens focusing position) of the lenses such as a zoom lens block at the time of the automatic focusing control, a moved amount (control amount) of the lenses is increased to a larger extent in the case of evaluation using the logarithmic characteristic (in the case of evaluation using the evaluation values corresponding to the logarithmic characteristic area) than in the case of evaluation using the linear characteristic area. In the exposure amount control and the dynamic range control at the time of the exposure control, changed amounts (control amounts) of the exposure amount and the dynamic range are increased to a larger extent in the case of evaluation using the logarithmic characteristic than in the case of evaluation using the linear characteristic. Therefore, a more precise and faster image sensing control can be carried in conformity with the various controls.

The evaluation value detector may preferably include a divided light measurer which detects the luminance of the picked-up image of the subject while dividing the picked-up image at least into a main subject area and a peripheral subject area located around the main subject area, each being divided into a specified number of detection blocks, and the evaluation values are detected based on a main subject luminance and a peripheral subject luminance corresponding to the main subject area and the peripheral subject area which are obtained from the luminance detection by the divided light measurer.

With this construction, the area (main subject area or peripheral subject area) where the evaluation values (luminance information) are obtained can be selected such that optimal evaluation values (luminance information) are used in conformity with the respective controls (e.g., exposure control, automatic focusing control and white balance control) in the image sensing control without constantly using the luminance information of the entire picked-up image (image sensing area) upon carrying out the image sensing control; the evaluation values can be detected based on the luminance information in each detection block; and the evaluation values from the main subject area or the peripheral subject area can be easily and securely detected (calculated).

The evaluation value detector may be preferably further provided with a histogram calculator which calculates a main subject luminance histogram corresponding to the main subject area and a peripheral subject luminance histogram corresponding to the peripheral subject area, and the evaluation values are detected based on the main subject luminance histogram and the peripheral subject luminance histogram.

With this construction, since the evaluation values are detected based on the luminance histograms (main subject luminance histogram and peripheral subject luminance histogram) calculated by the histogram calculator, desired evaluation values can be easily and securely detected from the subject luminances in the respective areas.

The evaluation values may be preferably any one of exposure evaluation values for an exposure control, automatic focusing evaluation values for an automatic focusing control and white balance evaluation values for a white balance control.

With this construction, an image sensing apparatus can be provided which is capable of precisely carrying out the AE control, the AF control or the WB control using these evaluation values.

Here, the definition of a concept of the "exposure control (hereinafter, "AE control" depending on cases)" referred to in the embodiments is described with reference to FIG. 6. Different from the so-called film cameras, image sensing apparatuses such as electronic cameras and electronic videos adopt a method for controlling a control factor for the AE control in conjunction with the photoelectric conversion characteristic of the image sensor (by artificially changing the photoelectric conversion characteristic) and a method for adjusting a total amount of light reaching a sensing surface of the image sensor and an integration period of a photoelectrically converted current. In this specification, the former is referred to as the "dynamic range control" and the latter is referred to as the "exposure amount control". The "dynamic range control" is executed by controlling, for example, a switching point (hereinafter, "inflection point") between a linear characteristic area and a logarithmic characteristic area of the image sensor. Further, the "exposure amount control" is executed, for example, by adjusting an aperture of a diaphragm or a shutter speed of a mechanical shutter or controlling an integration period of electric charges through a control to reset the image sensor.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An image sensing apparatus, comprising:
    an image sensor adapted to generate an electrical signal corresponding to an amount of an incident light and having a photoelectric conversion characteristic comprised of a linear characteristic area where the electrical signal is outputted after being linearly converted in relation to the amount of the incident light and a logarithmic characteristic area where the electrical signal is outputted after being logarithmically converted in relation to the amount of the incident light;
    an evaluation value detector adapted to detect evaluation values concerning an image sensing control from each of the linear characteristic area and the logarithmic characteristic area upon picking up an image of a subject based on pieces of subject luminance information in the respective areas, the evaluation value detector being adapted to perform a specified data conversion to standardize the pieces of subject luminance information in the respective areas into the luminance information corresponding to either one of the respective areas and detect the evaluation values based on the standardized luminance information;
    an image sensing controller adapted to carry out the image sensing control based on the evaluation values corresponding to the respective areas detected by the evaluation value detector; and
    a conversion information storage device adapted to save conversion information for the specified data conversion,
    wherein the evaluation value detector is adapted to convert an output level of the subject luminance corresponding to one of the respective areas into an output level corresponding to the other area based on the conversion information saved in the conversion information storage device.

2. An image sensing apparatus according to claim 1, wherein the image sensing controller is adapted to carry out the image sensing control while treating the control amounts in conformity with the evaluation values corresponding to the logarithmic characteristic area to be larger than those in conformity with the evaluation values corresponding to the linear characteristic area.

3. An image sensing apparatus according to claim 2, wherein the evaluation value detector includes a divided light measurer adapted to detect the luminance of the picked-up image of the subject while dividing the picked-up image at least into a main subject area and a peripheral subject area located around the main subject area, each being divided into a specified number of detection blocks, and the evaluation values are detected based on a main subject luminance and a peripheral subject luminance corresponding to the main subject area and the peripheral subject area which are obtained from the luminance detection by the divided light measurer.

4. An image sensing apparatus according to claim 3, wherein the evaluation value detector further includes a histogram calculator adapted to calculate a main subject luminance histogram corresponding to the main subject area and a peripheral subject luminance histogram corresponding to the peripheral subject area, and the evaluation values are detected based on the main subject luminance histogram and the peripheral subject luminance histogram.

5. An image sensing apparatus according to claim 4, wherein the evaluation values are any one of exposure evaluation values for an exposure control, automatic focusing evaluation values for an automatic focusing control and white balance evaluation values for a white balance control.

6. An image sensing apparatus according to claim 1, wherein the image sensing controller is adapted to carry out the image sensing control while treating the control amounts in conformity with the evaluation values corresponding to the logarithmic characteristic area to be larger than those in conformity with the evaluation values corresponding to the linear characteristic area.

7. An image sensing apparatus according to claim 1, wherein the evaluation value detector includes a divided light measurer adapted to detect the luminance of the picked-up image of the subject while dividing the picked-up image at least into a main subject area and a peripheral subject area located around the main subject area, each being divided into a specified number of detection blocks, and the evaluation values are detected based on a main subject luminance and a peripheral subject luminance corresponding to the main subject area and the peripheral subject area which are obtained from the luminance detection by the divided light measurer.

8. An image sensing apparatus according to claim 1, wherein the evaluation values are any one of exposure evaluation values for an exposure control, automatic focusing evaluation values for an automatic focusing control and white balance evaluation values for a white balance control.

9. An image sensing apparatus, comprising:
an image sensor adapted to generate an electrical signal corresponding to an amount of an incident light and having a photoelectric conversion characteristic comprised of a linear characteristic area where the electrical signal is outputted after being linearly convened in relation to the amount of the incident light and a logarithmic characteristic area where the electrical signal is outputted after being logarithmically convened in relation to the amount of the incident light;
an evaluation value detector adapted to detect evaluation values concerning an image sensing control from each of the linear characteristic area and the logarithmic characteristic area upon picking up an image of a subject based on pieces of subject luminance information in the respective areas, the evaluation value detector being adapted to perform a specified data conversion to standardize the pieces of subject luminance information in the respective areas into the luminance information corresponding to either one of the respective areas and detect the evaluation values based on the standardized luminance information;
an image sensing controller adapted to carry out the image sensing control using control amounts in conformity with the evaluation values corresponding to the respective areas detected by the evaluation value detector; and
a conversion information storage device adapted to save conversion information for the specified data conversion, wherein the evaluation value detector is adapted to convert an output level of the subject luminance corresponding to one of the respective areas into an output level corresponding to the other area based on the conversion information saved in the conversion information storage device.

10. An image sensing apparatus according to claim 9, wherein the image sensing controller is adapted to carry out the image sensing control while treating the control amounts in conformity with the evaluation values corresponding to the logarithmic characteristic area to be larger than those in conformity with the evaluation values corresponding to the linear characteristic area.

11. An image sensing apparatus according to claim 10, wherein the evaluation value detector includes a divided light measurer adapted to detect the luminance of the picked-up image of the subject while dividing the picked-up image at least into a main subject area and a peripheral subject area located around the main subject area, each being divided into a specified number of detection blocks, and the evaluation values are detected based on a main subject luminance and a peripheral subject luminance corresponding to the main subject area and the peripheral subject area which are obtained from the luminance detection by the divided light measurer.

12. An image sensing apparatus according to claim 11, wherein the evaluation value detector further includes a histogram calculator adapted to calculate a main subject luminance histogram corresponding to the main subject area and a peripheral subject luminance histogram corresponding to the peripheral subject area, and the evaluation values are detected based on the main subject luminance histogram and the peripheral subject luminance histogram.

13. An image sensing apparatus according to claim 12, wherein the evaluation values are any one of exposure evaluation values for an exposure control, automatic focusing evaluation values for an automatic focusing control and white balance evaluation values for a white balance control.

14. An image sensing apparatus according to claim 9, wherein the evaluation value detector includes a divided light measurer adapted to detect the luminance of the picked-up image of the subject while dividing the picked-up image at least into a main subject area and a peripheral subject area located around the main subject area, each being divided into a specified number of detection blocks, and the evaluation values are detected based on a main subject luminance and a peripheral subject luminance corresponding to the main subject area and the peripheral subject area which are obtained from the luminance detection by the divided light measurer.

15. An image sensing apparatus according to claim 9, wherein the evaluation value detector further includes a histogram calculator adapted to calculate a main subject luminance histogram corresponding to the main subject area and a peripheral subject luminance histogram corresponding to the peripheral subject area, and the evaluation values are detected based on the main subject luminance histogram and the peripheral subject luminance histogram.

16. An image sensing apparatus according to claim 9, wherein the evaluation values are any one of exposure evaluation values for an exposure control, automatic focusing evaluation values for an automatic focusing control and white balance evaluation values for a white balance control.

* * * * *

UNITED STATES PATENT AND TRADEMARK OFFICE
CERTIFICATE OF CORRECTION

PATENT NO. : 7,508,422 B2 Page 1 of 1
APPLICATION NO. : 11/052327
DATED : March 24, 2009
INVENTOR(S) : Koichi Kamon, Kazuchika Sato and Jun Minakuti It is certified that error appears in the above-identified patent and that said Letters Patent is hereby corrected as shown below:

<u>Column 45</u>:
line 23, delete "logarithmically convened" and
       insert -- logarithmically converted --.

Signed and Sealed this

Twelfth Day of May, 2009

JOHN DOLL
*Acting Director of the United States Patent and Trademark Office*